(12) United States Patent
Matyjaszewski et al.

(10) Patent No.: US 6,624,262 B2
(45) Date of Patent: Sep. 23, 2003

(54) POLYMERIZATION PROCESS FOR IONIC MONOMERS

(75) Inventors: Krzysztof Matyjaszewski, Pittsburgh, PA (US); Nicolay Tsarevsky, Pittsburgh, PA (US)

(73) Assignee: Carnegie Melon University, Pittsburgh, PA (US)

( * ) Notice: Subject to any disclaimer, the term of this patent is extended or adjusted under 35 U.S.C. 154(b) by 63 days.

(21) Appl. No.: 09/972,260

(22) Filed: Oct. 5, 2001

(65) Prior Publication Data
US 2002/0107340 A1 Aug. 8, 2002

Related U.S. Application Data

(60) Provisional application No. 60/238,809, filed on Oct. 6, 2000.

(51) Int. Cl.[7] .................................................. C08F 4/44
(52) U.S. Cl. ......................... 526/90; 526/91; 526/240; 526/310; 526/328
(58) Field of Search ..................................... 526/90, 91

(56) References Cited

U.S. PATENT DOCUMENTS

| | | | |
|---|---|---|---|
| 5,763,548 A | 6/1998 | Matyjaszewski et al. | |
| 5,789,487 A | 8/1998 | Matyjaszewski et al. | |
| 5,807,937 A | 9/1998 | Matyjaszewski et al. | |
| 5,886,118 A | * 3/1999 | Percec | 526/146 |
| 5,945,491 A | 8/1999 | Matyjaszewski et al. | |
| 6,111,022 A | 8/2000 | Matyjaszewski et al. | |
| 6,121,371 A | 9/2000 | Matyjaszewski et al. | |
| 6,124,411 A | 9/2000 | Matyjaszewski et al. | |

FOREIGN PATENT DOCUMENTS

| | | |
|---|---|---|
| WO | WO 99/28352 | 6/1999 |
| WO | WO 00/75198 | 12/2000 |

\* cited by examiner

*Primary Examiner*—David W. Wu
*Assistant Examiner*—R. Rabago
(74) *Attorney, Agent, or Firm*—Kirkpatrick & Lockhart LLP

(57) ABSTRACT

The present invention describes preparation of nanocomposite particles and structures by polymerizing monomers onto a functional inorganic colloid comprising a polymerization initiation site. The polymerization process is preferably a controlled/living polymerization process, including but not limited to, atom transfer radical polymerization and stable free radical polymerization. The nanocomposite particles can self-organize in solution, on surfaces or in films forming nanocomposite structures. Tethered AB block nanocomposite particles bring size control, solubility control and control over micro- and macro-functionality to the particles. The process may be catalyzed by a transition metal complex which participates in a reversible redox cycle with at least one of the group and a compound having a radically transferable atom or group, to form a nanocomposite particle with a tethered polymer chain. The process may be continued to form tethered copolymer chain. The particle may be silicon based including, for example, silica, silicates and polysilsesquioxane. A nanocomposite structure may be formed by casting, depositing or forming the material including nanocomposite particles.

7 Claims, 5 Drawing Sheets

What Can CRP Do?

$DP_n = \Delta[M]/[I]_0$; $200 < M_n < 200{,}000$; $1.04 < M_w/M_n < 1.5$

Compositions

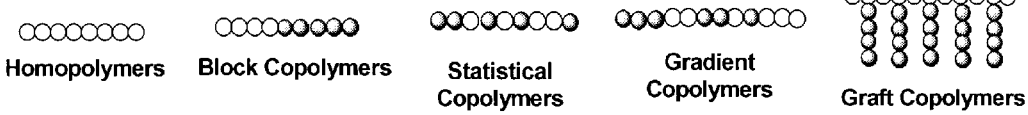

Homopolymers  Block Copolymers  Statistical Copolymers  Gradient Copolymers  Graft Copolymers

Architecture

Linear  Star / Multi-Armed  Comb Polymers  Networks  (Hyper)Branched

Functionality

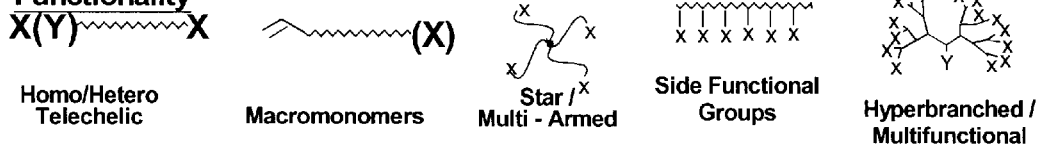

Homo/Hetero Telechelic  Macromonomers  Star / Multi-Armed  Side Functional Groups  Hyperbranched / Multifunctional

Molecular Composites

Hybrids with Inorganic & Biopolymers  Functional Colloids  Modified Surfaces

FIGURE 3

POLYMERIZATION PROCESS FOR IONIC MONOMERS

CROSS REFERENCE TO RELATED APPLICATIONS

This application is a nonprovisional application claiming priority from U.S. application Ser. No. 60/238,809 filed on Oct. 6, 2000.

FIELD OF INVENTION

The invention is directed towards controlled polymerization processes for monomers bearing ionic substituents and for preparation of block copolymers, including water soluble block copolymers. More specifically, the invention is directed towards extending and improving the utility of controlled or living radical (co)polymerization processes by disclosing the parameters and requirements for the controlled polymerization of radically (co)polymerizable monomers from initiators bearing additional functionality and provides for the direct production of polymers bearing ionic substituents by the direct (co)polymerization of monomers comprising ionic substituents, particularly in the presence of water.

BACKGROUND OF THE INVENTION

There is a continuing effort in polymer chemistry to develop new polymerization processes and new polymers. A relatively recent development in polymer chemistry has been the development of controlled or living polymerization processes. A controlled or living polymerization process is one in which chain transfer and termination reaction are essentially nonexistent relative to the polymer propagation reaction. These developments have led to the production of polymers that exhibit macro functionality and to the development of functional polymers that possess specific chemical reactivity. The new polymers extend the level of control available to materials engineers in processing polymers and using polymers as building blocks in, or components for, subsequent material forming reactions, such as copolymerizations, chain extensions and crosslinking reactions, and interaction with substrates, including dispersed solids.

A significant economic hurdle which continually needs to be overcome in this effort is to provide the benefits of controlled polymerization from available low cost monomers in available commercial process equipment. These long term objectives have provided the backdrop, or driving force, for the continuing advances in controlled polymerization of radically (co)polymerizable monomers, disclosed in earlier patent applications, and provide the incentive to extend, simplify and make more robust the process known as atom transfer radical polymerization (ATRPo).

The recently developed ATRP process and polymers developed from the classic ATRP reaction are described in U.S. patent application Ser. No. 09/018,554, now U.S. Pat. No. 6,538,091 and 09/534,827, the entire contents of which are hereby incorporated herein by reference. Methods for exercising control over many parameters in a catalytic process for the controlled polymerization of a wide range of free radically (co)polymerizable monomers have been described in publications authored or co-authored by Krzysztof Matyjaszewski and others. See for example, Wang, J. S. and Matyjaszewsk, K., *J. Am. Chem. Soc., vol.* 117, p.5614 (1995); Wang, J. S. and Matyjaszewsk, K., *Macromolecules,* vol. 28, p. 7901 (1995); K. Matyjaszewski et al., *Science,* vol. 272, p.866 (1996); K. Matyjaszewski et al., "Zerovalent Metals in Controlled/"living" Radical Polymerization," Macromolecules, vol. 30, pp. 7348–7350 (1997); J. Xia and K. Matyjaszewski, "Controlled/"Living" Radical Polymerization. Homogenous Reverse Atom Transfer Radical Polymerization Using AIBN as the Initiator," *Macromolecules,* vol. 30, pp. 7692–7696 (1997); U.S. patent application Ser. No. 09/126,768, now U.S. Pat. No. 6,121, 371, the entire contents of which are hereby incorporated by reference; U.S. Pat. Nos. 5,807,937, 5,789,487, 5,910,549, 5,763,548, 5,789,489, 5,945,491, 6,111,022, 6,121,371, 6,124,411 and 6,162,882, and U.S. patent application Ser. No. 09/034,187, U.S. Pat. No. 6,407,187, Ser. No. 09/018, 554, U.S. Pat. No. 6,538,091, Ser. No. 09/431,871, U.S. Pat. No. 6,162,882, Ser. Nos. 09/359,359, 09/359,591, U.S. Pat. No. 6,512,060, Ser. No. 09/369,157, U.S. Pat. No. 6,541, 580, Ser. No. 09/126,768, U.S. Pat. No. 6,121,371, and Ser. No. 09/534,827, the entire contents of each are hereby incorporated herein by reference. The subtle interactions between the parameters have been further explored and implementation of the teachings disclosed in these publications has allowed the preparation of many inherently useful novel materials displaying control over functionality and topology, and production of novel tele-functional building blocks for further material forming reactions, resulting from application of the site specific functional and topological control attainable through this robust controlled polymerization process for free radically (co)polymerizable monomers.

The system or process employed to gain control over the polymerization of free radically (co)polymerizable monomers has been described in earlier applications as comprising the use of four components: (i) an initiator molecule; (ii) a transition metal compound having (iii) an added or associated counterion and the transition metal compound complexed with (iv) a ligand(s). The initiator molecule, or polymerization originator molecule may be any molecule comprising one or more radically transferable atom(s) or group(s) capable of participating in a reversible redox reaction with the transition metal compound. The transition metal compound may include an added or associated counterion and comprise a transition metal salt. So that all reactive oxidation states are soluble to some extent in the reaction medium, the transition metal may be complexed with the ligand(s). The components of the system may be optimized to provide more precise control for the (co) polymerization of the free radically polymerizable monomers. See U.S. Pat. No. 5,763,548, the entire contents of which are hereby incorporated herein by reference.

In an embodiment known as "reverse" ATRP, the initiator molecule described above can be formed in-situ by reaction of a free radical with the redox conjugate of the transition metal compound. Other components of the polymerization system such as the choice of the radically transferable atom or group, counterion initially present on the transition metal, and optional solvent may influence the process. U.S. Pat. No. 5,807,937 provides as an example of a single molecule containing a combination of functions, a complex in which the counterion and ligand components are in one molecule. The role of a deactivator, the "persistent radical," or for ATRP, the transition metal redox conjugate, is also described in U.S. Pat. No. 5,807,937.

While not to be limited to the following description, the theory behind ATRP disclosed in the previous work is that polymerization proceeds essentially by cleavage (and preferably essentially homolytic cleavage) of the radically transferable atom or group from the initiator molecule or, during the polymerization process the dormant polymer chain end, by a reversible redox reaction with a complexed transition metal catalyst, without any strong carbon-transition (C-Mt) bond formation between the active growing polymer chain end and the transition metal complex. Within this theory as the transition metal complex, in a lower active oxidation state, or in its activator state, activates the initiator or dormant polymer chain end by homolytically removing the radically transferable atom or group from the initiating molecule, or growing polymer chain end, in a reversible redox reaction, an active species is formed that allows other chemistry, essentially free radical based chemistry to be conducted. The transition metal complex in the higher oxidation state, the redox conjugate state or deactivator state, transfers a radically transferable atom or group to the active initiator molecule or growing chain end, thereby reforming the lower oxidation state transition metal complex. When free radical based chemistry occurs, a new molecule comprising a radically transferable atom or group is also formed. In prior publications, the catalytically active transition metal compound, which can be formed in situ or added as a preformed complex, has been described as containing a range of counterions. The counterion(s) may be the same as the radically transferable atom or group present on the initiator, for example a halide such as chlorine or bromine, or may be different radically transferable atoms or groups. An example of the latter counterion is a chloride counterion on the transition metal compound when the initiator first contains a bromine. Such a combination allows for efficient initiation of the polymerization followed by a controlled rate of polymerization, and has additionally been shown to be useful in certain crossover reactions, from one set of (co)monomers to a second set of (co)monomers, allowing efficient formation of block copolymers.

For the present purposes "polymers" include homopolymers and copolymers (unless the specific context indicates otherwise), which may be block, random, statistical periodic, gradient star, graft, comb, (hyper)branched or dendritic polymers. The "(co)" parenthetical prefix in conventional terminology is an alternative, viz., "(co)polymer means a copolymer or polymer, including homopolymer, while "(co)polymerizable means a monomer that is directly polymerized by the polymerization mechanism being discussed and additionally includes a comonomer which can only be incorporated into the polymer by copolymerization. Similarly "(hyper)" is meant to incorporate the concept that the degree of branching along the polymer backbone can vary from a low degree of branching up to a very high degree of branching.

Here, and elsewhere in the text the word "control and/or controlled" means that in the polymerization process conditions are defined whereby the contributions of the chain breaking processes are insignificant compared to chain propagation, so that polymers with predetermined molecular weights, low polydispersities and high functionalities are achievable.

It is widely accepted that controlled polymerization should display the following features.

Feature 1.

First-order kinetics behavior, i.e. the polymerization rate ($R_p$) with respect to the monomer concentration ([M]) is a linear function of time. This is due to the lack of termination, so that the concentration of the active propagating species ([P*]) is constant.

$$R_p = \frac{-d[M]}{dt} = k_p[P^*][M] \tag{1.1}$$

$$\ln\frac{[M]_0}{[M]} = k_p[P^*]t = k_p^{app}[P^*]t \text{ (if } [P^*] \text{ is constant)} \tag{1.2}$$

$k_p$ is the propagation constant. The result of eq.1.2 is illustrated in FIG. 1.

FIG. 1 is a semilogarithmic plot and is very sensitive to the change of the concentration of the active propagating species. A constant [P*] is revealed by a straight line, and an upward curvature indicates an increased [P*], which occurs in case of a slow initiation. On the other hand, a downward curvature suggests the decrease of [P*], which may result from termination or some other side reactions such as the catalytic system being poisoned.

It should also be noted that the semilogarithmic plot is not sensitive to chain transfer process or slow exchange between different active species, since they do not affect the number of the active propagating species.

Feature 2.

Predetermined degree of polymerization ($X_n$), i.e. the number average molecular weight ($M_n$) is a linear function of monomer conversion.

$$X_n = \frac{M_n}{M_0} = \frac{\Delta[M]}{[I]_0} = \frac{[M]_0}{[I]_0} \text{ (conversion)} \tag{1.3}$$

This result comes from a constant number of chains throughout the polymerization, which requires the following two conditions:
the initiation should be sufficiently fast so that nearly all chains start to grow simultaneously;
no chain transfer occurs to increase the total number of chains. FIG. 2 illustrates the ideal growth of molecular weights with conversion, as well as the effects of slow initiation and chain transfer on the molecular weight evolution.
Importantly, the evolution of molecular weights is not very sensitive to chain termination, since the number of chains remains unchanged. Only when coupling reaction plays a significant role for polymers with very high molecular weights, is the effect of termination observable on the plot.

Feature 3.

Narrow molecular weight distribution. Although this feature is very desirable, it is not necessarily the result from a controlled polymerization, which requires only the absence of chain transfer and termination, but ignores the rate of initiation, exchange and depropagation. Substantial studies [Gold, 1958 #84; Coleman, 1963 #88; Matyjaszewski, 1995 #85; Hsieh, 1996 #81; Matyjaszewski, 1996 #86] indicate that in order to obtain a polymer with a narrow molecular weight distribution, each of the following five requirements should be fulfilled.

i. The rate of initiation is competitive with the rate of propagation. This condition allows the simultaneous growth of all the polymer chain.
ii. The exchange between species of different reactivities is faster than propagation. This condition ensures that all the active chain termini are equally susceptible to reaction with monomer for a uniform growth.
iii. There must be negligible chain transfer or termination.
iv. The rate of depropagation is substantially lower than propagation. This guarantees that the polymerization is irreversible.

v. The system is homogenous and mixing is sufficiently fast. Therefore all active centers are introduced at the onset of the polymerization.

This should yield a Poison distribution, as quantified in eq.1.4.

$$\frac{X_w}{X_n} = \frac{M_w}{M_n} = 1 + \frac{X_n}{(X_n+1)^2} \cong 1 + \frac{1}{X_n} \quad (1.4)$$

According to eq.1.4, polydispersity ($M_w/M_n$) decreases with increasing molecular weight. A polymerization that satisfies all five prerequisites listed above is expected to have a final polymer with a polydispersity less than 1.1 for $X_n$ greater than 10.

Feature 4.

Long-lived polymer chains. This is a consequence of the negligible chain transfer and termination. Hence, all the chains retain their active centers after the full consumption of the monomer. Propagation resumes upon the introduction of additional monomer. This unique feature enables the preparation of block copolymers by sequential monomer addition.

The significance of controlled polymerization as a synthetic tool is widely recognized. Polymers having uniform and predictable chain length are readily available. Controlled polymerization provides the best opportunity to control the bulk properties by selection and control of various aspects of the multitude of variations in composition, functionality and topology at a molecular level. The result of such control over the preparation of polymeric materials is shown schematically in FIG. 3.

ATRP is one of the most promising methods in the field of controlled/"living" radical polymerizations, one which can be applied to a wide variety of monomers and provide well defined polymers. However, only a very limited range of polar, water soluble or hydrophilic monomers could be polymerized by ATRP processes particularly in aqueous systems. Monomers comprising a polar, or an ionic substituant, can be very efficient complexing agents for one or more of the oxidation states of the transition metal catalyst as it participates in the repetitive redox reaction with the initiator or growing polymer chain and this was thought to be a limitation on the range of monomers that could be used as comonomers in ATRP. However, since polymers with a full range of in-chain, or terminal ionic functionality, find application in the preparation of composite structures, adhesives, and in coating products in addition to personal care products by offering a means to control interfacial chemistry there was an incentive to overcome this limitation and directly prepare materials incorporating monomers with disparate functionality into copolymers. ATRP reactions are complicated by the interactions of the components of the reaction medium, for instance, monomer may interact with the transition metal catalyst, the solvent may interact with the monomer and the solvent may interact with the initiator. Thus there exists a need for a process for polymerizing polar and ionic monomers by ATRP and a need for the novel polymers which may be prepared by such a process. Further, there is a need for a process for the controlled polymerization of water soluble macroinitiators.

SUMMARY OF THE INVENTION

The present invention provides a controlled polymerization process for initiating the polymerization of free radically (co)polymerizable polar or ionic monomers in the presence of a system initially including a transition metal complex, and an initiator comprising a radically transferable azide group particularly in aqueous systems. Additionally, a controlled polymerization process for (co)polymerization of radically polymerizable ionic monomer including initiating the polymerization of free radically (co)polymerizable ionic monomers in the presence of a system initially comprising a transition metal complex, and an initiator comprising a radically transferable atom or group, and an excess of one or more uncomplexed ligands is provided. The uncomplexed ligands stabilize the transition metal complex and reduce the disproportionation of the transition metal. Ionic monomers polymerizable by this process include both anionic and cationic monomers.

A controlled polymerization process for the preparation of water soluble block copolymers including the use of water soluble macroinitiators is also provided in the present invention. As well as novel polymers consisting of water soluble blocks that have not been previously prepared prior to the present invention.

Additionally, the present invention includes procedures for synthesis of novel water soluble block copolymers, block copolymers comprising monomers with polar functionality, block copolymers with monomers comprising ionic functionality and zwitterionic block copolymers in homogeneous aqueous systems.

DESCRIPTION OF THE FIGURES

FIG. 3 is a table illustrating examples of the polymers available through controlled polymerization processes;

DETAILED DESCRIPTION OF THE INVENTION

Figure 1:
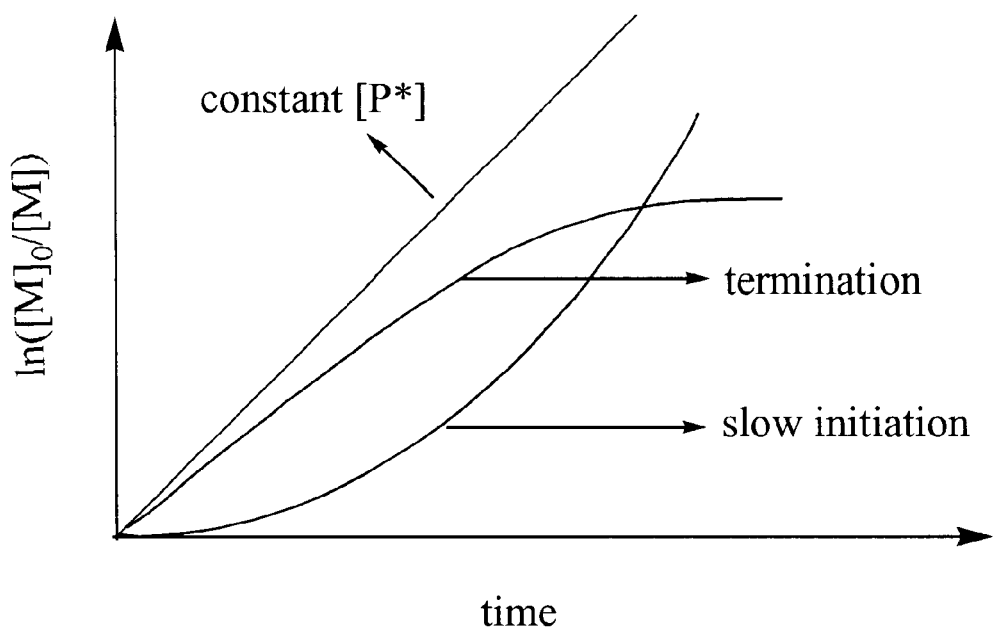
FIG. 1 is a graph illustrating the dependence of $\ln([M]_0/[M])$ versus time for various controlled and uncontrolled polymerization processes.
Figure 2:
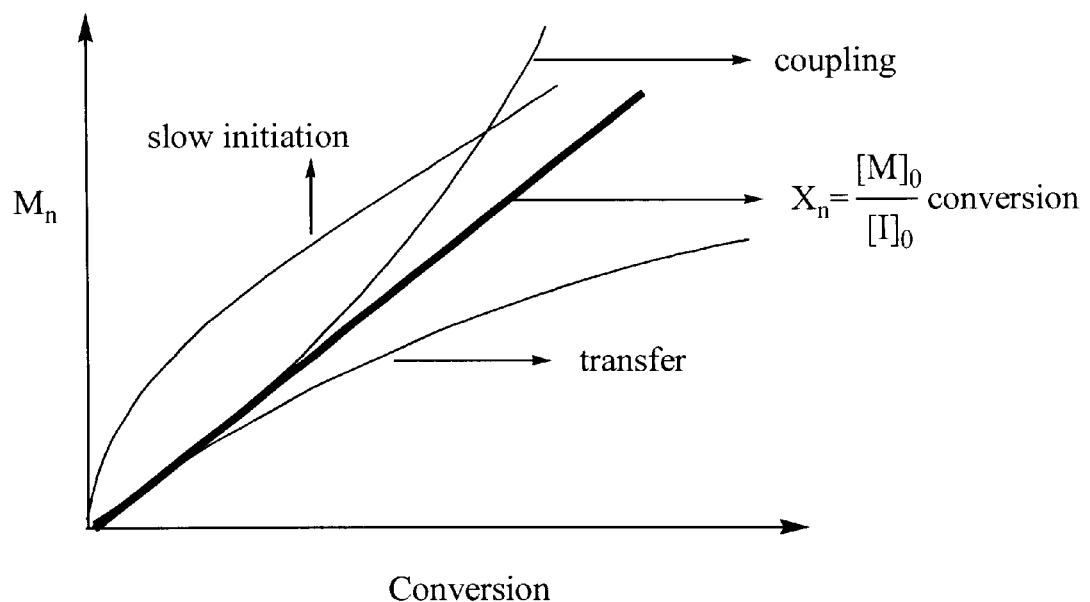
FIG. 2 is a graph illustrating the dependence of molecular weight versus conversion for and ideal controlled polymerization and the effects of the slow initiation, chain transfer and coupling of uncontrolled polymerization processes on the molecular weight change versus conversion.

A further advance has been made which comprises conditions for the controlled polymerization of radically (co)polymerizable monomers by conducting a transition metal mediated controlled, essentially radical, (co)polymerization of monomers bearing ionizable ionic or substituents. Herein we teach how control over or selection of an appropriate radically transferable atom or group, can lead to a further extension in the range of (co)polymerizable monomers directly incorporated into an ATRP polymerization. In addition conditions for the incorporation of monomers bearing ionic functional groups have been defined and it is now possible to directly prepare polymers with site specific, ionic functional groups.

The preparation of such polymers requires a full understanding, and control, of all the parameters involved the formation of monomer/polymer transition metal complexes and in the disproportionation of "ligand free" transition metal complexes in ionic media. Unless this disproportionation reaction is controlled, or at least suppressed, the catalyst can no longer exist at the desired concentrations in the two oxidation states required for the redox reaction that is fundamental in ATRP and the controlled polymerization reaction does not proceed. While this understanding was developed during experiments directed towards the polymerization of monomers comprising a cationic functionality, and are described in conjunction with polymerization of cationic monomers in the following discussion it is important to note that this approach can be applied not only for cationic monomers, but also for neutral monomers and monomers comprising an anionic functionality, which may not react sufficiently well with the lower oxidation state of the catalyst, or interact preferentially with the higher oxidation state (thus destabilizing the lower oxidation state, and making it more likely to disproportionate).

In the following discussion we will use copper or iron as an exemplary transition metals but as taught in other applications a wide range of other transition metals are possible and in some occasions preferable. Polymers prepared by other polymerization process methods can be end- or side-functionalized and incorporated into ATRP as macroinitiators or macromonomers or as disclosed in a co-pending provisional U.S. application Ser. No. 60/238,812; disclosing simultaneous use of both macroinitiator and macromonomer, which can be used to improve incorporation of the macromonomer into the polymer leading to improved block and graft copolymers. There may be one or multiple initiating sites, leading to chain growth in several directions. The initiator may carry a special functionality, in addition to a radically transferable atom or group, to yield homo- or hetero-telechelic materials. Reactions can be run under homogeneous or heterogeneous conditions, the former generally give better control. Reaction temperatures typically range from room temperature to 150° C., but can be correspondingly altered. The reaction can be run under vacuum or pressure. Reactions can be conducted in the presence of moisture, or even in water under both homogeneous and heterogeneous (emulsions, suspensions) conditions. Oxygen should be removed but a limited amount of oxygen can be tolerated, particularly in the presence of an oxidizable transition metal, e.g. $Cu^0$ species and oxygen can be deliberately added to prepare a transition metal complex comprising mixed oxidation states The order of addition of reagents may vary but most often the initiator is added last to the preformed solution of the catalyst in monomer and optionally a solvent. An important parameter may be the addition or formation of a small amount of CuII species at the beginning of the reaction (U.S. Pat. No. 5,807,937) since it enables the deactivation process to occur without requiring the spontaneous formation of the persistent radical or deactivator by termination reactions, thereby providing instantaneous control. Indeed it is this requirement for the simultaneous availability of the transition metal complex in two available oxidation states (at concentrations determined by the equilibrium constant of ATRP) that has limited the application controlled polymerization of a broad spectrum of ionic monomers in metal mediated polymerizations, particularly in aqueous systems. In the present disclosure we teach that one must suppress the inherent tendency for disproportionation of $Cu^I$ to $Cu^{II}$ and $Cu^0$ in aqueous systems in order to retain control over ATRP of ionic monomers. Specifically, one must ensure that the transition metal is present in both activating state and deactivating state (at the appropriate concentration) throughout the polymerization. As discussed below one must take steps to prevent water from displacing the organic ligand and allowing a "naked", or weakly complexed cuprous ion the opportunity to disproportionate into the cupric ion and copper zero.

The role of both fragments of the initiator molecule on the terminal functionality present in a polymer chain when the polymer is prepared by a controlled polymerization process is shown in FIG. 3. The selection of an initiator with a specific transferable atom or group with a specific transition metal complex has also been shown to provide additional control over initiation, propagation and (co)monomer incorporation in earlier applications. The present invention includes the use of an azide group acting as the radically transferable group in a redox reaction with the transition metal complex for the polymerization of ionic monomers. The azide group remains on the polymer end group and is reactive in further applications, such as, grafting to a polymer or to a substrate, or participate in chain extesion and crosslinking reactions and is therefor directly usable in such applications without further functionalization. The azide containing initiators may have both transferable and non-transferable azide functionality for the preparation of azido containing polymers. Furthermore, use of the azide group allows the direct (co)polymerization of monomers substituted with an ionic group. This is of particular value when one wishes to conduct the polymerization in the presence of water, since water can displace the halogen at the copper in addition to displacement of certain ligands (Haddleton D. M. et. al Chem Comm, 683 (1997); Ashford, E. J. et. al. Chem Comm, 1285 (1999)) but it is not as likely to displace azide group when present on the transition metal complex. Furthermore, while water can also hydrolize the radically transferably halide when present in the initiator or dormant polymer chain end the use of azides as radically transferable group decreases the possibility of initiator (or chain-end) hydrolysis.

Examples of this approach which demonstrate, solely as a means of showing utility and which is not meant to limit applicability, are the direct polymerization of sodium 4-vinylbenzoate and 2-trimethylammonioethyl methacrylate methanesulfonate. Direct incorporation of such ionic monomers, one bearing anionic and one a cationic substituant, into a polymer is a lower cost and more efficient route to functional materials comprising an ionic substituant, than use of masked functional groups in an polymerization process followed by deprotection of the substituant as described in prior art procedures. It is therefor now possible to add reactive unprotected ionic side functional groups directly to a polymeric material. The addition of as little as 0.1 mole % of the ionic monomer to a copolymerization will statistically provide one functional group in each polymer chain as the degree of polymerization (DP) exceeds 1000. For polymers of lower degree of polymerization the incorporation of one functional group in each chain is most conveniently conducted by use of an initiator bearing the desired functional group or conversion of the radically transferable atom or group into the desired functionalty. Polymers bearing such ionic functionality may find application in blending and alloying with other polymers, in addition to direct application. Materials with such reactive functional groups can directly interact with materials bearing other appropriate reactive functional groups, or with substrates or mineral additives or reinforcement materials containing reactive functional groups directly forming coatings, composites, adhesives and components for health care products. In addition, the azide group itself is reactive under external stimuli and also readily transformed into other funtional groups. Exemplary reactions discussed in earlier appliations are the conversion of azido-terminated polystyrenes which can be reduced to primary amino groups with lithium aluminum hydride and azido-terminated poly-acrylates which can be converted to phosphoranimines with triphenyl phosphine and to amines by subsequent hydrolysis.

There are two roles for an azide functionality when comprising functionality on an initiator in ATRP, a azide group as a primary substituent and, as secondary substituent. Using an azide as a primary substituent means to introduce azide functionality into the polymer as a functional group that remains on the non-transferable residue of the initiator. As a secondary functional group, the azide acts as the radically transferable group and introduces functionality at the growing polymer chain end and additionally allows direct incorporation of monomers comprising functional ionic groups into a polymer. As such it allows incorporation of a different range of (co)monomers into a (co)polymer compositions than the first case. Use of both a primary azide and a secondary azide in one initiator molecule allows for the direct preparation of "homo"-telechelic-azo-materials. The suffix "homo-" is used to indicate that the functional end groups are both azo-groups but that the reactivity of the two azo-groups differ.

In the preparation of an azide based initiators, with a radically transferable azide group, the first approach was to prepare an initiator with a structure similar to one shown suitable for ATRP using a halide as the radically transferable atom. In this manner it would be possible to examine the polymerization of a monomer additionally comprising a functional group under conditions known to allow a controlled polymerization. The monomer chosen to exemplify this extension of the capabilities of ATRP to the direct preparation of an azo-functional telechelic polymer was polymerization of dimethylaminoethyl methacryate (DMAEMA) in aqueous solution. The polymerization using the azide group as the radically transferable group was slower than a polymerization run with bromine as a radically transferable atom. The polymerization was controlled indicating that azide based initiators were suitable for evaluation in the polymerization of monomers bearing a tertiary amine functional group. Polymers comprising a DMAEMA group can be converted into polymers comprising ionic functionality by alkyation of the diethylamonium group thereby forming polymers comprising cationic functionality. This is exemplified by the reaction of a DMAEMA block copolymer with methyl iodide to form 2-methacryloxyethyl trimethyl ammonium iodide. Methyl iodide was convenient to use in the laboratory but one skilled in the art would readily identify additional alkylating agents which could be selected depending on the structure of the polymer desired for the application.

There are, however, advantages for the direct preparation of such materials. The first ionic monomer chosen for direct polymerization with an azide initiator was a monomer bearing an anionic functional group. The monomer selected was the sodium salt of p-vinyl benzoic acid which has been polymerized in a controlled radical polymerization process by Keoshkerian B., Macromolecules 28, 6381, (1995); and by Gabaston, L. I., et al. in *Polym. Prepr.* 38(1): 719–720 (1997) and *Polymer* 40 (16), 4505–40(16), 4505–4514 (1999); using nitroxide mediated polymerization process and by Wang X.-S; et,at.; Macromolecules 33, 255 (2000) using a standard halide initiator in ATRP. The monomer was sucessfully homopolymerized and copolymerized using an azide group as the transferable group by selecting a polymerization temperature that allowed polymerization to occur in an appropriate time frame.

In addition to allowing the formation of (co)polymers comprising an ionic functional group the use of initiators bearing an azide group as a primary substituent on the initiator residue or as a radically transferable group allows the direct preparation of telechelic polymers with functional azide end groups, as well block- and gradient/random copolymers bearing this useful functional group on each growing polymer chain end, in addition to the optional primary azido-functionality that would remain on the initiator residue. Such groups have been shown to be responsive to external energy stimulation forming chain extended materials. As such the polymers are capable of forming powder coatings crosslinkable or chain extendable by microwave energy.

A very simple, clean process was developed for the preparation of a polyethylene glycol azo-based monofunctional macroinitiator. It is a process that can be applied to the functionalization of any hydroxy containing molecule and is a process that would have much lower environmental impact, when implemented commercially, than use of an acid halide for the esterification reaction. The free acid is used with catalytic amounts of dicyclohexylcarbodiimide and a base as condensing agents. The polyethylene glycol-based monofunctional initiator was chosen to provide a water soluble macroinitiator for the preparation of a block copolymer, one in which each block is soluble in water. In addition, it also allowed the determination of MW by NMR. The synthesis described herein is different, more convenient, and has lower environmental impact than the usually used reaction of haloacylbromide with PEG in the presence of triethylamine since this last reaction requires dry reagents, and uses amine and acid bromide which are highly toxic and malodorous.

This is only one example of several water soluble block copolymers whose preparation is taught herein. Some difficulty was initially encountered in measuring the molecular weight and molecular weight distribution of a polymer comprising such ionic functional groups since it was thought that the functional group would have to be protected prior to running the GPC. We found however that it was possible to run GPC directly and that the formed block polymers displayed the MW and MWD of materials prepared under well controlled conditions.

The next step was to prepare water soluble block copolymers solely by a radical process wherein each block comprises polymer segments soluble in water. Several examples are provided wherein 2-DMAEMA, 2-HEMA, and ionic monomers are polymerized. The polymerization of water soluble monomers such as DMAEMA, 2-HEMA, and HEA to form homopolymers by ATRP, in bulk and in organic solvents has been discussed in earlier applications and papers by Matyjaszewski and coworkers and the work has been subsequently confirmed by publication of conditions for polymerization of these monomers in addition to monomethoxy-capped oligo(ethylene oxide)meth acrylate by Armes. The polymerization of DMAEMA is improved when methanol solvent rich mixtures were used for the polymerization since methanol improves the solubility of the deactivator.

During the work discussed to this point in the application, and in the work disclosed in earlier applications, it is interesting to note that while a broad spectrum of functional monomers that can be polymerized by a radical polymerization mechanism in bulk or in organic solvents only a limited range of water soluble polar monomers which include, DMAEMA, substituted hydroxy (meth)acrylates, or sodium 4-vinylbenzoate have been successfully polymerized by ATRP in aqueous systems. This observation was important as we considered the conditions required for controlled polymerization of monomers comprising cationic substituents or anionic substituents such as sulfonates. Ultimately these monomers were successfully incorporated into polymers prepared by controlled process for the first time, but this success required a deeper understanding of the chemistry associated with the behavior of a transition metal catalyst capable of undergoing a redox reaction in aqueous solution and that this knowledge be applied to the polymerization process.

2-Trimethylammonioethyl methacrylate methanesulfonate, and triflate (TMAEMT), were chosen as exemplary monomers comprising a cationic substituent and while they were successfully (co)polymerized, initial experiments encountered an apparent extremely rapid deactivation reaction. The experience with TMAEMAT was similar to that encountered with another monomer which had never been successfully polymerized by ATRP, sodium 4-styrenesulfonate, in both cases the reaction mixtures rapidly turned green despite careful degassing of the reactants. This observation was initially attributed to oxidation but may have been due to a disproportionation reaction of an organic ligand deprived transition metal complex. A precipitate of $Cu^0$ was not observed which would clearly indicate disproportionation, but it is not always readily observable.

Polymerization of styrene in heterogeneous aqueous media using PMDETA as the ligand also proved difficult using conventional ATRP techniques, however, analysis of the unsuccessful attempts assisted in clarifing some of the interactions that are important in polymerization systems comprising water as a component. The copper(I)PMDETA complex is very soluble in water, and according to the analysis below in this example, the effect of significant disproportionation was also observed.

We have noted before that only certain water soluble and/or ionic monomers, DMAEMA, hydroxy (meth) acrylates, or sodium 4-vinylbenzoate, can be polymerized by ATRP and that further note that these monomers can form complexes with the transition a metal catalyst. While this makes a controlled polymerization difficult, it does allow a controlled polymerization to be conducted since the transition metal complex (complexed with both added ligand and monomer/polymer) remains available to participate in the redox reaction. When we first attempted to conduct polymerization of ionic monomers that do not form complexes with the catalyst system, the reactions appeared to stop due to the rapid appearance of oxidized catalyst.

Though not wishing to limit the scope of the invention, it is now believed that in the highly polar media formed during the attempted polymerization of polar or ionic monomers in bulk, or in aqueous solution, the transition metal complex can lose a ligand, or the bond strength of the associated ligand may be weaken, in either case a disproportionation reaction exemplified by the disporportionation of $Cu^I$ to $Cu^{II}$ and $Cu^0$ may occur. (The appearance of $Cu^0$ is not readily seen in the scale of reactions being studied and can be masked by the strong color of the CuII species.)

Navan N., et.al. *Inorg. Chem* 38 3484–88 (1999) indicated that in order suppress such a disproportionation reaction it is necessary to use a ligand wherein the $Cu^I$ complex is significantly more stable than the $Cu^{II}$ complex. Datta, D., *Ind. J. Chem* 26A 860 (1987) had shown that the polarity of the medium is another important factor that influence the equilibrium constant for the disproportionation of $Cu^I$ as defined by equation 2.0.

$$K_{disp} = \frac{[Cu^{II}]}{[Cu^I]^2} \tag{2.0}$$

It has been shown that $logK_{disp}$ decreases with decreasing the polarity of the solvent $\epsilon$ in the order: water ($\epsilon$=78.54) $logK_{disp}$=6.00 [Fenwick, F., *J. Am. Chem. Soc.*, 48, 860 (1926)], methanol ($\epsilon$=32.63) $logK_{disp}$=3.55 and ethanol ($\epsilon$=24.33) $logK_{disp}$=0.55, [Randles, J. E. B., *J. Chem. Soc.*, 802 (1941)], and acetone ($\epsilon$=20.70) $logK_{disp}$=−1.50 [Coetzee, J. F., Siao, W., *Inorg. Chem.*, 2, 14 (1963)]. This strong dependence on the polarity of the solvent can be explained using the Born solvation model, i.e. assuming that the solvent-solute interactions are of purely electrostatic origin.

Even in the presence of ligands preferentially stabilizing $Cu^I$, such as 2,2'-bipyridyl (bpy), a significant disproportionation is observed when some salts, including ionic monomers, are added to an aqueous system (e.g., high concentration of the monomer 2-trimethylammonioethyl methacrylate triflate)—these ionic species can significantly increase the polarity of the system and thus increase $K_{disp}$. We propose that in such a case, the disproportionation reaction has to be suppressed in order to provide a transition metal complex that can catalyze an ATRP reaction, and that this can be accomplished by the addition of a large excess of a ligand capable of stabilizing the $Cu^I$ catalyst complex. In the absence of compounds increasing the polarity of the medium, no disproportionation is observed when bpy is used as the ligand in aqueous solution.

The fundamental basis for the above interpretation, and resulting procedures we teach herein for conducting a controlled transition metal mediated polymerization in highly polar media, can be reached by considering the disproportionation reaction in the presence of a ligand L, (the case covering addition of several molecules that can function as ligands will be also considered), forming complexes with both copper ions, can be schematically represented as:

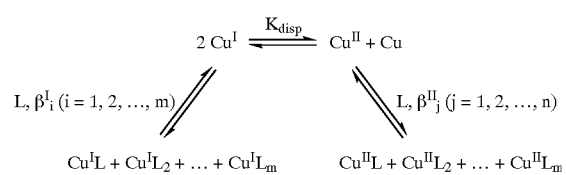

In the above scheme, $K_{disp}$ is the disproportionation equilibrium constant in the absence of any side reactions, $\beta^I_i$ and $\beta^{II}_j$ are the overall stability constants of the complexes of $Cu^I$ and $Cu^{II}$ with the ligand L, respectively.

We now introduce the conditional constant of disproportionation $K_{disp}^*$, analogous to other conditional equilibrium constants discussed by Schwarzenbach, G., *Die Komplexometrische Titration*, 2$^{nd}$ Ed., F. Enke, Stuttgart, 1956; Ringbom, A., *J. Chem. Educ.*, 35, 282–88 (1958); Flaschka, H. A., *EDTA Titrations*, Pergamon, New York, 1959, Ch. 4; Ringbom, A., *Complexation in Analytical Chemistry*, Interscience, New York, London, 1963; Ringbom, A., Harju, L., *Anal. Chim. Acta*, 59, 33–47; 49–58 (1972); Ringbom, A., Still, E., *Anal. Chim. Acta*, 59,143–6 (1972); and Smith, R. M., Martell, A. E., *Critical Stability Constants, Vol. 2: Amines*, Plenum, New York, 1975; can now be introduced. It is given by the total equilibrium concentrations of all copper species, i.e., the sum of the concentrations of free ions and all copper complexes present in the system. Thus, one can write:

$$K_{disp}^* = \frac{[Cu^{II}]_{tot}}{[Cu^I]_{tot}^2} \tag{2.1}$$

Now, α-coefficients for the copper species participating in side complex-formation reactions, showing the significance of these reactions, are defined as:

$$\alpha^I = \frac{[Cu^I]_{tot}}{[Cu^I]} = \frac{[Cu^I] + \sum_{i=1}^{m}[Cu^I L_i]}{[Cu^I]} = 1 + \sum_{i=1}^{m}\beta_i^I [L]^i \quad (2.2)$$

$$\alpha^{II} = \frac{[Cu^{II}]_{tot}}{[Cu^{II}]} = \frac{[Cu^{II}] + \sum_{i=1}^{n}[Cu^{II} L_j]}{[Cu^{II}]} = 1 + \sum_{j=1}^{n}\beta_j^{II} [L]^j \quad (2.3)$$

With those, the conditional equilibrium constant $K_{disp}*$ can be rewritten as:

$$K_{disp}^* = \frac{\alpha^{II}[Cu^{II}]}{(\alpha^I)^2[Cu^I]} = \frac{\alpha^{II}}{(\alpha^I)^2} K_{disp} \quad (2.4)$$

The above relation clearly shows that if the ligand L forms more stable complexes with the lower-oxidation state copper ion than with the higher oxidation state copper ion, then the disproportionation reaction can be largely suppressed. It also demonstrates the possibility to "adjust" this equilibrium as desired by using an appropriate ligand at the appropriate concentrations. It should be noted that even if a ligand is not strongly-binding to either $Cu^I$ or $Cu^{II}$ but it is present in large excess e.g., if it can be added as a solvent, or indeed if it is a monomer in the polymerization reaction, it can still significantly suppress the disproporionation provided that the ratio $\alpha^{II}/(\alpha^I)^2$ is much less than unity. The limited success that has been attained for the controlled ATRP of polar or ionic monomers has occurred when the monomer or macroinitiator can form a complex with the $Cu^I$ species.

Let us now consider the case when two ligands L and M are present in the system. The overall stability constants of the complexes will now be designated as $\beta_{i,L}^I$ (i=1, 2, ..., m), $\beta_{j,L}^{II}$ (j=1, 2, ..., n) (for the $Cu^I$ and $Cu^{II}$ complexes of the ligand L, respectively), $\beta_{k,M}^I$ (k=1, 2, ..., p), and $\beta_{l,M}^{II}$ (l=1, 2, ..., q) (for the corresponding complexes of $Cu^I$ and $Cu^{II}$ with M). Again, α-factors for both $Cu^I$ and $Cu^{II}$ for both ligands L and M can be used, and for each oxidation state of copper, the α-coefficient is the sum of the coefficients for both ligands minus one, i.e. [Ringbom, A., *Complexation in Analytical Chemistry*, Interscience, New York, London, 1963]:

$$\alpha^I = \alpha^{I,L} + \alpha^{I,M} - 1 = 1 + \sum_{i=1}^{m}\beta_{i,L}^I [L]^i + \sum_{k=1}^{p}\beta_{k,M}^I [M]^k \quad (2.5)$$

$$\alpha^{II} = \alpha^{II,L} + \alpha^{II,M} - 1 = 1 + \sum_{j=1}^{n}\beta_{j,L}^{II} [L]^j + \sum_{l=1}^{q}\beta_{l,M}^{II} [M]^l \quad (2.6)$$

The conditional disproportionation constant can be expressed exactly as above (Eq. 2.4) but using the new definitions of the α-coefficients.

The outlined approach can be extended for more than two side reactions (i.e., with more than two ligands present); it should only be born in mind that the α-coefficient for each species ($Cu^I$ or $Cu^{II}$) is a sum of the α-coefficients for all of the side reactions, minus the number of these reactions plus one.

ILLUSTRATIVE EXAMPLES

Illustrative Example 1

We can consider determining how much the disproportionation equilibrium constant for the copper species will decrease in the presence of 0.1 M pyridine (a model for bipy type ligands). The overall stability constants of the pyridine complexes of $Cu^I$ are $\beta_1^I = 6.92 \times 10^4$, $\beta_2^I = 3.89 \times 10^7$, $\beta_3^I = 1.51 \times 10^8$, and $\beta_4^I = 3.31 \times 10^8$, and these of the $Cu^{II}$-complexes are $\beta_1^{II} = 3.63 \times 10^2$, $\beta_2^{II} = 2.82 \times 10^4$, $\beta_3^{II} = 5.01 \times 10^5$, and $\beta_4^{II} = 3.16 \times 10^6$ [Smith, R. M., Martell, A. E., *Critical Stability Constants, Vol. 2: Amines*, Plenum, New York, 1975].

From the above data, using equations 2.1 and 2.4, the α-coefficients for $Cu^I$ and $Cu^{II}$ can be calculated; they are $\alpha^I = 5.80 \times 10^5$ and $\alpha^{II} = 1.14 \times 10^3$, respectively. Consequently, at this concentration of the ligand, more stable complexes are formed with $Cu^I$ than with $Cu^{II}$, and the disproportionation constant will decrease by a factor of $(\alpha^I)^2/\alpha^{II} = 2.95 \times 10^8$.

Illustrative Example 2

We can also determine how much the disproportionation equilibrium constant for the copper species will change in the presence of 0.1 M ethylenediamine (en) (a model for linear amine based ligands) taking into account only the formation of the complexes containing two ligands. The overall stability constant of the en complex of $Cu^I$ is $\beta_2^I = 1.58 \times 10^{11}$, and that of the $Cu^{II}$ complex is $\beta_2^{II} = 1.10 \times 10^{20}$. [data also from Smith, R. M., Martell, A. E., *Critical Stability Constants, Vol. 2: Amines*, Plenum, New York, 1975]. The α-coefficients for $Cu^I$ and $Cu^{II}$ are $\alpha^I = 1.58 \times 10^9$ and $\alpha^{II} = 1.10 \times 10^{18}$, respectively. At this concentration of the ligand forming more stable complexes with $Cu^{II}$ than with $Cu^I$, the added en, the disproportionation constant will decrease by a factor of only $(\alpha^I)^2/\alpha^{II} = 2.27$. In other words, addition of a ligand of the type modeled by en will not significantly influence the disproportionation reaction.

It can be concluded from these two illustrative examples that adding an excess of PMDETA (similar behavior to en) to a polymerization being conducted in aqueous media will not have a significant effect on the disproportionation, but using excess of bpy can have a strong effect. Unfortunately, bpy is not very soluble in aqueous media, however pyridine is soluble and it is possible that pyridine can be used as a solvent, or a component of the reaction mixture, and act to suppress the disproportionation reaction.

Illustrative Examples 3 & 4

Two mixtures containing the cationic monomer TMAEMT were prepared to exemplify application of the present invention to systems comprising an ionic monomer that does not complex with $Cu^I$. In both experiments, very careful degassing was performed (up to 10 freeze-pump-thaw cycles) in order to minimize oxidation and clearly indicate if significant amounts of disproportionation were occurring resulting in the rapid production of any $Cu^{II}$ complex. The first reaction medium contained a mixture of methanol and water as the solvent, and the second reaction medium contained the same amounts of pyridine and water. When CuCl/bpy (1:20) was added to both mixtures, very fast disproportionation was observed in the former case (a green colored solution was formed and precipitation of Cu occured) while in the second case, the pyridine containing solution, the complex formed a brown solution that appeared to be stable for more than a week. This clearly indicates minimization of the disproportionation and strongly indicates the present invention stabilizes catalysts used in ATRP.

Very similar behavior is seen from other "difficult" ATRP water-soluble monomers comprising anionic functional groups such as sodium 4-styrenesulfonate that were not polymerizable by ATRP prior to the present invention.

Another water soluble monomer which forms significantly more stable complexes with $Cu^{II}$ than with $Cu^{I}$, is vinylimidazole. It can be expected that in the absence of added ligand, or ligand substitute, disproportionation of the catalyst will be a significant problem in this case as well. In order to make the polymerizations possible, donating solvents (or ligand surrogates), stabilizing $Cu^{I}$ should be used as additives to the reaction medium.

Monomers which exemplify a broad class of ionic monomers that inherently do not complex with the transition metal, include 2-DMAEMA, 2-HEMA, sodium 4-vinylbenzoate, poly(ethylene glycol)methacrylate monomethyl ether, and sodium methacrylate. Therefore we now teach procedures for the polymerization of ionic monomers which not only do not interact with copper species, but significantly increase the polarity of the medium, thus favoring disproportionation of the catalyst, particularly in aqueous systems. Addition of excess ligand, or a ligand substitute such as pyridine, allows the transition metal complex to be present in the two oxidation states required for metal mediated living radical polymerization.

Experimental Section

Synthesis of Azide Initiators

EXAMPLE 1

2-azido Ethanol

The initial approach to the preparation of an azide containing initiator was direct replacement of the bromine atom in a "standard" ATRP initiator using the chemistry shown to be suitable for transformation of a bromine on the end group on a polymer prepared by ATRP. The direct approach resulted in low isolated yield after extraction of the initiator, although full conversion had been confirmed by GC. It appears that 2-azido ethanol is soluble in water.

An alternate procedure was carried out with trimethylsilyl azide in tetrahydrofuran solution in the presence of tetrabutylammonium fluoride and potassium fluoride. This method resulted in the formation of the 2-azidoethanol product, however, the reaction was found to be much slower than described in the literature and the product contained some associated tetrabutylammonium fluoride.

The third method used a phase transfer catalyst in water and also yielded 2-azido ethanol in poor isolated yields although GC analysis showed 100% conversion and no byproducts.

EXAMPLE 1a

Synthesis of 2-Azido Ethanol Using Sodium Azide

TABLE 1

|  | ratio | Mole | weight [g] | volume [ml] | solvent [ml] |
|---|---|---|---|---|---|
| 2-Bromo ethanol | 1 | 0.1 | 12.5 | 7.1 |  |
| Sodium azide | 1.1 | 0.11 | 7.15 |  | 220 |

The reaction was carried out in polar solvent, either DMF or DMSO. The product contained in both cases a small amount of solvent. 2-Bromoethanol was added to a 0.5 M solution of $NaN_3$ in DMSO/DMF and the reaction mixture was stirred overnight at room temperature. Then water and ether were added, the layers separated and the organic layer extracted with water. The organic layer was dried with $MgSO_4$ and then solvent was evaporated.

Characterization is made with $^1$H-NMR and FT-IR.

$^1$H-NMR: δ: 3,81 (t, 2H); 3,41 (t, 2H); 2,75 (s, 1H)

FT-IR: $cm^{-1}$: 3550–3100(b); 2110(s)

EXAMPLE 1b

Synthesis of 2-Azido Ethanol Using Trimethylsilyl Azide

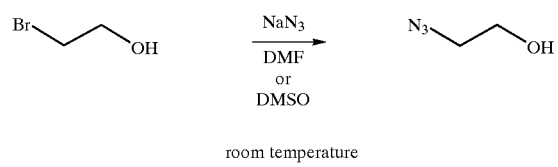

TABLE 2

|  | ratio | Mole | weight [g] | volume [ml] | solvent [ml] |
|---|---|---|---|---|---|
| 2-Bromo ethanol | 1 | 0.1 | 12.5 | 7.1 |  |
| TMS azide | 1.1 | 0.11 |  | 14.7 |  |
| KF | 1.1 | 0.11 | 6.4 |  |  |
| TBAF | 0.1 | 0.01 |  | 1 | 1 M THF solution |

A dry round bottom flask was charged with 2-bromo ethanol, trimethylsilyl azide and potassium fluoride under nitrogen. To this mixture was added a solution of tetrabutylammonium fluoride. After stirring two days, the reaction mixture was diluted with ether, the precipitate was filtered off and the solvent evaporated. The product contained, besides 2-azido ethanol, some tetrabutylammonium compound. The production of 2-azido ethanol was confirmed by $^1$H-NMR. δ: 3,81 (t, 2H); 3,41 (t, 2H); 2,75 (s, 1H)

EXAMPLE 1c

Synthesis of 2-Azido Ethanol Using a Phase Transfer Catalyst

TABLE 3

|  | ratio | Mole | weight [g] | volume [ml] | solvent [ml] |
|---|---|---|---|---|---|
| 2-Bromo ethanol | 1 | 0.01 | 1.25 | 0.71 |  |
| Sodium azide | 1.5 | 0.015 | 0.975 |  |  |
| Tetrahexylammonium bromide | 0.1 | 0.001 | 0.435 |  |  |
| Water |  |  |  |  | 5 |

The components were mixed in a 25 ml round bottom flask and stirred at room temperature. Conversion is determined by GC analysis. After 2 days there is 99% conversion. Water and ether are added, the organic layer extracted with water, then dried with $MgSO_4$ and the solvent evaporated. An orange liquid is obtained. It is slightly viscous. The product contains some tetrabutylammonium compound and the yield is 40%.

EXAMPLE 2

Synthesis of 2-Azido-1-Methylethanol

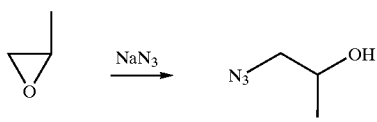

The method used was first described for the reaction of epoxides (especially CHO) with sodium azide (J. Org. Chem. 1999, 64, 6094). The conditions were modified and in a typical experiment 2.06 ml ($2.94*10^{-2}$ mol) of propylene oxide were added to a solution of 4.78 ($7.35*10^{-2}$ mol) sodium azide in 15 ml water. After stirring for 20 hr, the 2-azido-2-methylethanol formed was extracted 2 times with 10 ml ether, then salt was added and the extraction is repeated 3 more times with 10 ml ether, then 5 times with 10 ml methylene chloride. The filtrated solutions were collected and dried over $MgSO_4$. Then the solvents are removed in vacuum first at room temperature. 1.4 g ($1.386*10^{-2}$ mol) yield: 47.15%

EXAMPLE 3

Synthesis of 2-Azidoethyl 2-Bromopropionate (Azo-Initiator 1)

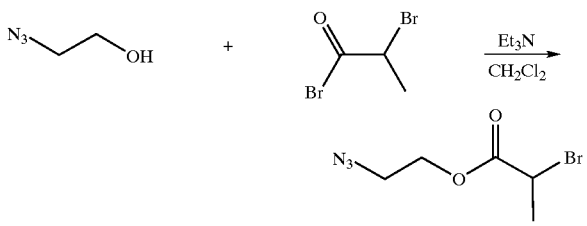

TABLE 4

|  | ratio | Mole | weight [g] | volume [ml] |
|---|---|---|---|---|
| 2-Azido ethanol | 1 | 0.046 | 4 |  |
| 2-Bromo propionyl bromide | 1.1 | 0.051 | 10.92 | 5.3 |
| Triethylamine | 1.1 | 0.051 | 5.12 | 7.06 |
| Methylene chloride |  |  |  | 80 |

The synthesis was carried out in methylene chloride at 0° C. A solution of 2-bromopropionyl bromide in methylene chloride was added dropwise to a mixture of 2-azidoethanol in methylene chloride, triethylamine was added to neutralize the formed hydrobromic acid. After stirring at room temperature over-night water was added and the organic layer was extracted three times with water, the organic phase was then dried and the solvent evaporated. The product was a mixture of byproducts and had to be separated via silica gel column producing pure 2-azidoethyl 2-bromopropionate. Characterization was made with $^1$H-NMR and FT-IR.

$^1$H-NMR: δ: 4.39 (q, 2H, $J_{HH}$=7.32); 4.33 (t, 2H, $J_{HH}$=5.13); 3.51 (t, 2H, $J_{HH}$=5.13); 1.85 (d, 3H, $J_{HH}$=7.32)

FT-IR: $cm^{-1}$: 3550–3100 (b); 2110 (s)

EXAMPLE 4

Synthesis of Ethyl 2-Azido 2-Methylpropionate from Ethyl 2-Bromo-2-Methylpropionate and Sodium Azide in Water with Tetrahexylammonium Bromide as the Phase-Transfer Catalyst The synthesis of organic azides by the $S_N$-reaction of organic halides and metal azides in the presence of phase-transfer catalysts, such as ammonium salts [2-4,6] or PEG-derivatives is a widely applied method. (In this reaction, a relatively large amount of the phase-transfer catalyst was used, as this is recommended for the cases, when the alkyl halide can easily hydrolyze.) 1.9602 g (10.06 mmol) ethyl 2-bromo-2-methylpropionate, 0.9769 g (15.03 mmol) sodium azide, and 0.8057 g (1.85 mmol) tetrahexylammonium bromide were mixed with 10 ml water. The resulting mixture was stirred at room temperature for 20 hours. (The progress of the reaction was followed by GC and after 20 hours no ethyl 2-bromo-2-methylpropionate was observed to remain in the reaction.) Then, the ethyl 2-azido-2-methylpropionate product was extracted with ether (3×20 ml), the ethereal solution was dried with sodium sulfate, and the ether was evaporated under vacuum. The yield is quantitative.

EXAMPLE 5

Synthesis of Ethyl 2-Azido-2-Methylpropionate from Ethyl 2-Bromo-2-Methylpropionate and Sodium Azide in Water with Tetrabutylammonium Hydrogensulfate as the Phase-Transfer Catalyst Ethyl 2-azido-2-methylpropionate was synthesized using the cheaper, and less soluble in organic solvents, phase-transfer catalyst tetrabutylammonium hydrogensulfate. 3.9094 g (20.04 mmol) ethyl 2-bromo-2-methylpropionate, 1.6265 g (25.02 mmol) sodium azide, and 1.6986 g (5.00 mmol) tetrabutylammonium hydrogensulfate were mixed with 15 ml water. The conversion of ethyl 2-bromo-2-methylpropionate was followed by GC. After 39 h, the reaction was complete. To the mixture, 10 ml water were added and the obtained ethyl 2-azido-2-methylpropionate was extracted with ether (3×20 ml). The combined ethereal solutions were dried with sodium sulfate and the solvent was removed in a rotary evaporator. The yield of ethyl 2-azido-2-methylpropionate was 2.815 g (17.8 mmol, or 88.8%). The ester was characterized by IR and $^1$H NMR spectroscopy. The NMR spectrum consists of the following signals (δ, ppm): 1.66 (t, 3H), 1.74 (s, 6H), and 4.12 (q, 2H). (For comparison, the spectrum of the ethyl 2-bromo-2-methylpropionate consists of signals at 1.31 (t, 3H), 1.92 (s, 6H), and 4.23 (q, 2H) ppm.)

EXAMPLE 6

Synthesis of Monofunctional Initiator: Ester of Monomethylated PEG ($Me_1PEG$) of Molecular Weight 550 with Bromoisobutyric Acid (BiBA). (This Can Be Considered a Water Soluble Macroininitiator for Preparation of Amphiphylic Block Copolymers or Water Soluble Block Copolymers.)

The preparation of esters of PEG and 2-bromo- and 2-chloropropanoic acid, starting from the corresponding acid chlorides in the presence of 4-dimethylaminopyridine (4-DMAP) and triethylamine in methylene chloride has been described in the literature [Jankova, K., Chen, X., Kops, J., Batsberg, W., *Macromolecules*, 31, 538–41 (1998)]. However, this reaction requires careful drying of all chemicals. There are many reports in the literature [Neises, B., Steglich, W., *Angew. Chem. Int. Ed. Engl.*, 17, 522–4 (1978); Hassner, A., Alexanian, V., *Tetrahedron Lett.*, 46, 4475–8 (1978)] that esterification of carboxylic acids and alcohols can be easily carried out at room temperature, giving high yields, for relatively short reaction times, when dicyclohexylcarbodiimide (DCC) in the presence of catalytic amount of a base, such as 4-DMAP, in methylene chloride, is used as the condensing agent. Using this reaction, the esterification of Me₁PEG with BiBA was performed giving a high yield of ester.

EXAMPLE 7

3.3480 g (20.05 mmol) BiBA was dissolved in 30 ml methylene chloride. To this solution, on stirring a solution of 11.07 g (20.13 mmol) Me₁PEG of a molecular weight of approximately 550 g/mol was added, and then 4.1342 g (20.04 mmol) solid DCC was added. Almost immediately after the addition of DCC, precipitation of dicyclohexylcarbamide occurred. The flask was put in an ice-water bath, and 0.113 g (0.92 mmol) 4-DMAP were added, and the mixture was stirred in the cooling bath for approximately 5 minutes. The flask was allowed to warm to room temperature and stirred for 5 hours. The precipitated dicyclohexylcarbamide was filtered and washed well on the filter with a total approximately 130 ml methylene chloride (after drying, its weight was 4.1913 g, or 18.68 mmol, which corresponds to 93.22% conversion of DCC). Then the solvent was removed from the combined solution and washings in a rotary evaporator. A slightly yellowish oil was obtained, containing some solid precipitate. The ester was then frozen and warmed to room temperature several times until no additional crystals separated. Then, it was filtered resulting in a yield of 12.8362 g (91.6%). The ester was characterized by IR (strong absorbance at 1720 cm⁻¹, no or insignificant absorbance at 3600–3200 cm⁻¹) and ¹H NMR (δ 1.93, 3.38, 3.65, and 4.32 ppm—signals with relative intensities approximately 6:3:54:2; relatively strong signal of acetone was also observed at 2.17 ppm) spectroscopy. (For comparison, the ¹H NMR spectrum of the initial Me₁PEG consists of two signals at 3.39 and 3.65 ppm, with relative intensities 3:63.)

EXAMPLE 8

Synthesis of a Polyethylene Glycol-Based Azide Macroinitiator, Me₁PEG—OOC—C(N₃)Me₂ of M.W.=661 g/mol (Azo-Initiator 2) [See, Pfaendler, H. R., Weimar, V., *Synthesis*, 1345 (1996)]

Reagents/conditions; 3.4998 g Me₁PEG—OOC—C(Br)Me₂ of M.W.=699 (5 mmol); 0.6501 g NaN₃ (10 mmol); 0.1602 g Bu₄NBr (0.5 mmol); Temperature: 85° C. The mixture was stirred for 27 h (after 25 h, the reaction was complete, based on ¹H NMR), cooled and extracted with 20 ml ether. The solution was filtered and the salts were extracted again with 20 ml ether. The solvent was evaporated from the combined solution. Yield: 2.924 g (88.5%). The singlet for the two methyl groups from the isobutyrate moiety is at 1.47 ppm, and this for the starting bromine compound is at 1.93 ppm. In the IR spectrum a signal at approximately 2100 cm⁻¹ is observed. Based on IR spectrum, it can be suggested, that the compound contains a certain amount of Me₁PEG (or it may also contain some moisture).

EXAMPLE 9

Synthesis of Methyl-1-Azido-1-Phenylacetate (Azo-Initiator 3)

The initiator 1 has been shown to be effective in the ATRP of DMAEMA in aqueous solution. Therefore, it was reasonable to synthesize the initiator, methyl-1-azido-1-phenylacetate, with the similar structure 2, and to check whether it can be used for the controlled polymerization of this monomer. The initiator 2, was synthesized according to the following scheme:

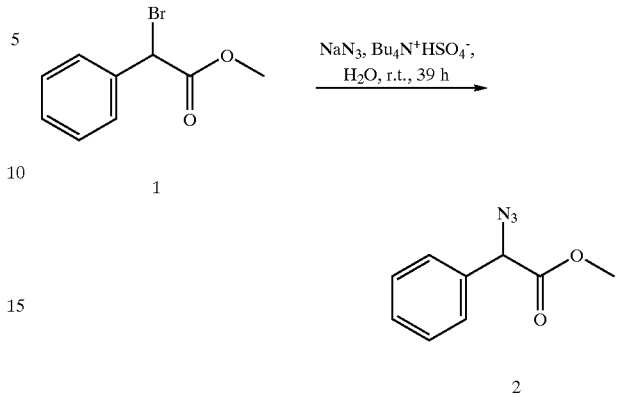

2.2908 g (10 mmol) of 1, 0.8137 g (12.5 mmol) sodium azide, and 0.8500 g (2.5 mmol) tetrabutylammonium hydrogensulfate were mixed with 7.5 ml water. The mixture was stirred at room temperature for 39 h, and at the end of the reaction, 5 ml water were added, followed by extraction with ether (3×10 ml). The combined ether solutions were dried over sodium sulfate, and ether was removed in a rotary evaporator. Yield 1.3383 g.

Synthesis of Polymers

To exemplify the preparation of telechelic polymers with azide end groups, as well defined block- and gradient/random copolymers, azide functionalized initiators; 2-azido ethyl 2-bromoisopropionate; α-methylbenzyl azide; and ethyl azidoisobutyrate were initially used for the controlled polymerization of styrene, MMA and n-butyl acrylate. The initiator used for styrene polymerization was α-methylbenzyl azide; and for the polymerization of n-butyl methacrylate, ethyl azidoisobutyrate was used as an initiator. The ethyl azidoisobutyrate initiator was prepared using phase-transfer catalysis, as described above. Polymerizations were successful and the azo-initiators were then used to polymerize more highly functional monomers.

EXAMPLE 10

Polymerization of Styrene with 2-Azido-1-Methylethyl-2-Bromopropionate
Reaction Conditions:
St/Cu$^I$Br/POAZBP-1/PMDETA=200/1/2/1. Temperature: 90° C. The polymerization behaved in a controlled manner where conversion increased linearly with time as molecular weight increased with conversion and a narrow MWD was maintained. After 260 minutes Yield=75.39%; Mn=5219; PDI=1.21.
When the Reaction Ratios are:
St/Cu$^I$Br/POAZBP-1/PMDETA=200/1/2/1, the Yield after 20 h is 98.52& and Mn=32,837; PDI=1.19.
When the Reaction Ratios S are:
St/Cu$^I$Br/POAZBP-1/PMDETA=400/1/2/1, the Yield after 20 h is 94.34% and Mn=26,639; PDI=1.15.

EXAMPLE 11

Polymerization of Styrene Using α-Methylbenzyl Azide

The polymerization of styrene using α-methylbenzyl azide (α-MBA) was carried out targeting much lower target molecular weights. The aim of this experiment and the following experiment was to obtain polymers that can be analyzed by MALDI for their end-groups. One of the experiments was done using copper (i) chloride based catalyst system, and the other one—copper (I) hexafluorophosphate.

(Comparator) Bulk ATRP of styrene (Sty) with α-MBA as initiator in the presence of $CuPF_6$/dNBpy (nvt-sty 5.) Styrene—5 ml; $CuPF_6$.4MeCN—0.2031 g (0.545 mol) dNbpy—0.4455 g; α-MBA—80 µl: Target DP=80. Temperature=90° C.

The mixture was stirred in a 10 ml Schlenk flask. The kinetic results along with the molecular weights results of the obtained polymers indicate that the polymerization is very fast and good control cannot be achieved with the PDI's in the range of 2.

EXAMPLE 12

Bulk ATRP of styrene (Sty) with α-MBA as initiator in the presence of CuCl/dNBpy (nvt-sty 6). Styrene—5 ml, CuCl—0.0546 g, dNbpy—0.4455 g, α-MBA—80 µl, Target DP=80. Temperature=90° C.

The mixture was stirred in a 10 ml Schlenk flask. The kinetic results along with these for the molecular weights of the obtained polymers show that the rate of polymerization is much slower and PDIs are lower than in the case when $CuPF_6$ is used as the catalyst as in Example 11. The polymer produced averaged a polydispersity of 1.5.

EXAMPLE 13

MMA polymerization using 2-azido-1-methylethyl 2-bromopropionate (POAZBr) as initiator. Feed: MMA:CuBr:POAZBr:BiPy=100:1:2:1. Reaction time: 1 h; reaction temperature=60° C. Yield: 78.3. Mn=44,070; PDI=1.29.

Water Soluble Block Copolymers

EXAMPLE 14

Synthesis of ester of $Me_1PEG$ with 2-Chloropropionic Acid 2-CPA (Nvt-Peg 4)

For this synthesis, the reaction of 2-CPA with $Me_1PEG$ of molecular weight 550 g/mol in the presence of DCC and 4-dimethylamonium pyridine (4-DMAP) was used. This initiator will be used in the aqueous polymerization of ionic monomers, derived from acrylates and styrenes, such as sodium 4-styrenesulfonate and sodium 4-vinylbenzoate, since it is expected to be hydrolytically more stable than the corresponding bromine derivative.

2.1765 g (20 mmol) 2-CPA and 11.07 g (20.1 mmol) $Me_1PEG$ of molecular weight approximately 550 g/mol were added to and dissolved in 30 ml methylene chloride. The mixture was immersed in ice-water bath and stirred while 4.133 g (20 mmol) melted DCC was added, and the beaker rinsed with approximately 5 ml methylene chloride, which was also added to the reaction mixture. Almost immediately after the addition of DCC, a precipitation of dicyclohexylcarbamide occurred. 0.11 g (0.92 mmol) 4-DMAP was then added and the mixture was stirred in the cooling bath for approximately 5 minutes. After this, the mixture was stirred at room temperature for 5 hours. The precipitated dicyclohexylcarbamide was filtered and washed well on the filter with total approximately 80 ml methylene chloride. After drying, its weight of the product was 4.292 g, or 19.1 mmol, which corresponds to 95.4% conversion of DCC. The solvent was removed from the combined solution and washings in a rotary evaporator. A slightly yellowish oil was obtained, containing some solid precipitate. The ester was then freezed and warmed to room temperature several times until no additional crystals separated. Then, it was filtered; yield: 11.512 g (17.97 mmol, 89.9%). The ester was characterized by IR (strong absorbance at 1720 $cm^{-1}$, insignificant absorbance at 3600–3200 $cm^{-1}$) and $^1H$ NMR spectroscopy.

EXAMPLE 15

Synthesis of Ester of $Me_1PEG$ with 2-Bromopropionic Acid 2-BPA (Nvt-Peg 5)

3.0632 g (20 mmol) 2-BPA and 11.08 g (20.1 mmol) $Me_1PEG$ of molecular weight approximately 550 g/mol was added were dissolved in 30 ml methylene chloride. The mixture was immersed in ice-water bath. Then, on stirring, 4.131 g (20 mmol) melted DCC was added, and the beaker from this reagent was rinsed with approximately 5 ml methylene chloride, which was also added to the reaction mixture. Almost immediately after the addition of DCC, a precipitation of dicyclohexylcarbamide occured. After this, 0.11 g (0.92 mmol) 4-DMAP were added, after which the mixture was stirred in the cooling bath for approximately 5 minutes. Then, the mixture was stirred at room temperature for 5 hours. The precipitated dicyclohexylcarbamide was filtered and washed well on the filter with total approximately 80 ml methylene chloride (after drying, its weight was 4.422 g, or 19.7 mmol, which corresponds to 98.5% conversion of DCC). Then the solvent was removed from the combined solution and washings in a rotary evaporator. A slightly yellowish oil was obtained, containing some solid precipitate. The ester was then freezed and warmed to room temperature several times until no crystals separated any more. Then, it was filtered; yield: 12.425 g (18.14 mmol, 90.7%). The ester was characterized by IR (strong absorbance at 1726 $cm^{-1}$, very slight absorbance at 3600–3200 $cm^{-1}$) and $^1H$ NMR spectroscopy (δ1.87 (d), 3.36 (s), 3.67, 4.32 (t), and 4.41 (q) ppm—signals with relative intensities approximately 3:3:58:2:1; the signal of methylene chloride was also observed at 5.30 ppm).

EXAMPLE 16

Preparation of Macroinitiator Based on Poly (HEMA) For the ATRP of DMAEMA (Nvt-Hema35)

The polymerization of HEMA was carried out in water-methanol mixtures since both the monomer and the polymer are soluble in methanol, but the polymer is not soluble in water. The PEG-based macroinitiator was used in order to prepare polymers which molecular weights can be analyzed using NMR. The catalyst was CuBr/bpy. The reaction proved to be very fast at 30° C. and even at room temperature, so Cu(II) was added in different amounts in order to slow down and improve the control over the polymerization. The total amount of copper was kept constant.

A large amount of poly(HEMA)-based macroinitiator of DP=100 (target) was prepared in order to chain extend it with DMAEMA.

Reagents:
CuCl—0.2246 g
$CuCl_2$—0.2494 g (45% of the total copper)
Bpy—1.2878 g HEMA—50 ml (53.65 g)
MeOH—35 ml, water—15 ml
MePEGBiB of M.W. 699 g/mol—2.25 ml; DP(target)—100
T=35° C.

TABLE 5

| Time of pzn, min | Conversion (grav.) | $M_n \times 10^{-3}$, g/mol (GPC) | PDI |
|---|---|---|---|
| 15 | 0.102 | 4.264 | 1.22 |
| 30 | 0.187 | 5.166 | 1.21 |
| 60 | 0.384 | 7.211 | 1.30 |
| 90 | 0.584 | 8.639 | 1.36 |
| 130 | 0.823 | 9.819 | 1.35 |
| 170 | 0.985 | 10.551 | 1.36 |
| 230 | 0.999 | 11.755 | 1.32 |
| 270 | 1 | 12.339 | 1.19 |

The polymer was purified by dissolving it in methanol, passing the solution through a column with basic alumina, concentrating the clear solution thus obtained, and precipitating the polymer in large excess of ether. After the purification, the molecular weight of the polymer was determined (DMF as the eluent, vs. poly(MMA) standards) as 12.43 kg/mol, PDI=1.18.

EXAMPLE 17

Preparation of Block-Copolymer of HEMA and DMAEMA in Aqueous Solution

Starting from a poly(HEMA) macroinitiator, the same conditions as for the polymerization of HEMA were applied to the polymerization of the second monomer, DMAEMA. The reaction was slower than the polymerization of HEMA but a low PDI block copolymer was prepared.

Reagents:
Poly(HEMA) of MW=4.420 kg/mol—0.176 g
1.4 ml methanol, 0.6 ml water
This solution was degassed by F-P-T 4 times, then to the frozen mixture the catalyst was added:
CuCl—0.0027 g
$CuCl_2$—0.0016 g (30% of the total copper)
Bpy—0.0124 g
Temperature: 35° C.

TABLE 6

| Time of polymerization, h | $M_n$, kg/mol | PDI |
|---|---|---|
| 0 (macroinitiator) | 4.420 | 1.64 |
| 20 | 6.369 | 1.16 |

EXAMPLE 18

Studies on the Homopolymerization of DMAEMA using PEG-Based Macroinitiator. [Formation of PEG-b-DMAEMA]

Several attempts were made to polymerize DMAEMA using the a MePEG-based macroinitiator, in mixtures of water and DMF with varying concentration of Cu(II) added to control the molecular weight distribtion. All conversions can be readily determined by GC using the signal of DMF as the internal standard. Molecular weights were determined by GPC using 50 mM LiBr in DMF as the eluent (vs. pMMA).

Initial reactions were done in water-DMF mixtures (1:1) at 25° C. using CuCl (and $CuCl_2$)/bpy complexes as the catalyst. Reactions were fast, but the rates were not very different no matter what the amount of Cu(II) was added. It turned out that this result arose from the slow solubility of the copper complex in the reaction medium—there was always some insoluble complex remaining in all samples taken for analysis. However when the experiments were performed in solvent containing a little more water, and the reaction mixtures were stirred before the addition of the initiator, in order to make sure the catalyst was entirely dissolved, there was a good correlation between the amount of Cu(II) added to the polymerization and the rate of the reaction. In all cases, there was a marked increase of the molecular weight with conversion (going up to approximately 8000 g/mol), and the polydispersities of the polymers ranged from 1.4 to 1.6, which is much better than in the initial experiments.

Polymerization of dimethylamino methacrylate using azo-initiator 2.

This experiment was carried out with the azo-initiator 2 (see above). 3.5 ml DMAEMA (3.266 g; 20.77 mmol); 0.0204 g CuCl (0.206 mmol) and 0.0646 g Bipy (0.416 mmol) were mixed and after 10 minutes a solution of the initiator (0.1359 g; 0.206 mmol) in 3.5 ml water was added. The reaction was too slow at 20° C., so after 2 hours at this temperature, the temperature was increased to 60° C. In 1 hour, approximately 11% conversion was achieved, and the resulted polymer had molecular weight of 990 g/mol (theoretical: approximately 1700 g/mol) and PDI of 1.04. The rate of polymerization was slower than with the bromine-based initiator (structure 1). This suggested that the initiator would find use in the polymerization of charged monomers.

EXAMPLE 19

Polymerization of Dimethylamino Methacrylate 7 ml DMAEMA (6.531 g; 41.5 mmol), 0.0206 g CuCl (0.208 mmol) and 0.0658 g BiPy (0.421 mmol) were mixed and stirred for 10 minutes. A clear brown solution was formed. To this solution, a solution of 0.1355 g (0.205 mmol) azo-initiator 2 in 7 ml water was added. The temperature of the experiment was maintained at 55° C. The progress of the polymerization is shown in Table 7.

TABLE 7

| Time, min | Conversion (grav.) | $M_n$ | PDI |
|---|---|---|---|
| 10 | 0.0703 | $1.06 \times 10^3$ | 1.03 |
| 30 | 0.0768 | $1.20 \times 10^3$ | 1.02 |
| 70 | 0.1165 | $1.40 \times 10^3$ | 1.04 |
| 200 | 0.2524 | 935 | 1.03 |

Polymerization of Ionic Monomers

EXAMPLE 20

Polymerization of Sodium 4-Vinyl Benzoate Using Azo-Initiator 2. (This is also the Preparation of a Water Soluble Block Copolymer.)

The aqueous ATRP of 4-vinylbenzoic acid (VBA) sodium salt has been reported to be a fast reaction even at ambient temperature. An experiment was performed to polymerize NaVBA in water. The catalyst was formed by adding 0.0100 g BiPy (0.064 mmol) to 0.0047 g CuBr (0.033 mmol) in 0.25 ml water. Then 0.5068 g (3.42 mmol) VBA, dissolved in 2.5 ml aqueous 1.7 M solution of sodium hydroxide (total, 4.28 mmol NaOH) was added, and at the end—0.25 ml solution of 0.0933 g (0.133 mmol) Me₁PEG ester of bromoisobutyric acid (M.W. 699 g/mol) initiator, dissolved in 1 ml 0.2 M NaOH (the amount of the initiator taken was consequently 0.0334 mmol). The mixture was stirred at 20–22° C. The reaction mixture became viscous, and after 10 hr. the polymerization was complete (based on NMR). The rate of conversion with time is presented below.

TABLE 8

| Time, h | Conversion (NMR) |
| --- | --- |
| 0.17 | 0.0476 |
| 1.5 | 0.1872 |
| 3.5 | 0.4231 |
| 9.75 | 0.9823 |

EXAMPLE 21

Polymerization of Sodium 4-Vinylbenzoate (NaVBA) in Water initiated by Azo-Initiator 2

Target DP=100; 4-VBA—0.5017 g (3.4 mmol); 1.7 M solution of NaOH CuPF$_6$.4MeCN—0.0132 g (0.035 mmol); BiPy—0.0108 g (0.067 mmol); azo-initiator 2 (Me₁PEG based)—22 μl; 60° C.

The conditions are the same as in the previous reaction, but the azo-initiator 2 was used as initiator since it was of interest to check whether the solubility of this macroinitiator plays a role in the characteristics of the final block copolymers.

TABLE 9

| Time of Polymerization, min | Conversion (NMR) | $M_n \times 10^{-4}$ | PDI |
| --- | --- | --- | --- |
| 30 | 0.11 | 3.024 | 1.35 |
| 180 | 0.28 | 4.936 | 1.31 |
| 315 | 0.50 | 8.635 | 1.11 |
| 1005 | 0.74 | | |
| 1230 | 0.83 | | |

The polymerization is relatively slow, but there is an increase of the molecular weights with conversion, and the PDI's are quite low, at conversions below 50%. This result indicates a controlled polymerization.

EXAMPLE 22

Polymerization of Sodium 4-Vinylbenzoate (NaVBA) in Water

Target DP=100; 4-VBA—0.5027 g (3.4 mmol); 1.7 M solution of NaOH; CuPF$_6$.4MeCN—0.0121 g (0.034 mmol); BiPy—0.0110 g (0.068 mmol); azide initiator—5 μl; 30° C.

4-Vinylbenzoic acid (VBA) is dissolved in 2 ml (purged for at least one hour) solution of NaOH. The resulting solution is added to an aqueous solution of the copper complex. The catalyst complex solution was formed by first degassing the solid substances, then 0.25 ml deoxygenated water and 0.05 ml NaOH solution are added. The initiator is then added. After certain times, samples were taken and the polymerization reaction was stopped by mixing 0.2 ml of the sample with 5 ml water and a few drops HCl (1:1). The precipitated monomer and polymer were filtered and dried.

In order to measure NMR spectra, the dry sample was dissolved in D₂O with the addition of sodium deuteroxide. Molecular weights can be measured in several ways, including conversion to methyl ester. This way, however, is not optimal, as the final polymer contains a significant quantity of the reagents, and also some unreacted polyvinylbenoic acid. That is why only some of the samples were analyzed for molecular weights by GPC in DMF.

TABLE 10

| Time of Polymerization, min | Conversion (NMR) | $M_n \times 10^{-4}$ | PDI |
| --- | --- | --- | --- |
| 180 | 0.09 | | |
| 300 | 0.10 | 5.94 | 1.93 |
| 510 | 0.18 | 13.87 | 1.26 |
| 1395 | 0.89 | | |
| 1470 | 0.92 | | |

Although the molecular weights are very high, the PDIs of the obtained polymers are much better than in the case of the neutral monomer DMAEMA.

EXAMPLE 23

Polymerization of Sodium 4-Vinylbenzoate (NaVBA) in Water

Target DP=100; 4-VBA—0.5027 g (3.4 mmol); 1.7 M solution of NaOH CuPF$_6$.4MeCN—0.0123 g (0.034 mmol); BiPy—0.0113 g (0.069 mmol); azide initiator—5.2 μl; 50° C.

The experimental conditions were the same as in example 24 but the temperature was increased in order to increase the rate of polymerization. The results indicate that in this example the polymerization was already quite fast.

TABLE 11

| Time of Polymerization, min | Conversion (NMR) | $M_n \times 10^{-4}$ | PDI |
| --- | --- | --- | --- |
| 45 | 0.66 | | |
| 90 | 0.86 | 10.84* | 1.43* |
| 180 | 0.87 | 7.047 | 2.34 |
| 420 | 0.88 | | |
| 1020 | 0.90 | 12.21 | 1.87 |

The value marked with an asterisk, was obtained when the pure acid was dissolved in DMF and directly injected into the GPC. This was the final sample analyzed in this experiment and demonstrates that conversion to methyl ester is not necessary. This means that PDl's and molecular weights determined after conversion to the ester are probably not reliable, and better results are obtained without this reaction.

EXAMPLE 24

Polymerization of Sodium 4-Vinylbenzoate (NaVBA) in Water

Target DP=100; 4-VBA—0.5017 g (3.4 mmol); 1.7 M solution of NaOH CuPF$_6$.4MeCN—0.0124 g (0.036 mmol); BiPy—0.0108 g (0.067 mmol); azide initiator—6.5 μl; 50° C.

The conditions are the same as in the previous reaction, but azo-initiator 3 is used as initiator instead of azo-initiator 1. The initial reaction mixture was a greenish color, and the resulting slower rate of polymerization can be attributed to fortuitous oxidation of the catalyst. This reaction was repeated at even higher temperature.

TABLE 12

| Time of Polymerization, min | Conversion (NMR) | $M_n \times 10^{-4}$ | PDI |
|---|---|---|---|
| 45 | 0.02 | | |
| 90 | 0.51 | 8.17 | 2.11 |
| 180 | 0.56 | 10.44 | 2.01 |
| 420 | 0.60 | | |
| 1470 | 0.68 | | |

EXAMPLE 25

Polymerization of Sodium 4-Vinylbenzoate (NaVBA) in Water Initiated by Azo-Initiator 3.

Target DP=100; 4-VBA—0.5008 g (3.4 mmol); 1.7 M solution of NaOH; CuPF6.4MeCN—0.0132 g (0.035 mmol); BiPy—0.0108 g (0.067 mmol); azo-initiator 3— 6.5 $\mu$; 60° C.

The conditions are the same as in the previous reaction, but the azide 3 used as initiator was purged with nitrogen for one hour prior to the experiment (in the previous case, the initiator was not purged).

TABLE 13

| Time of Polymerization, min | Conversion (NMR) | $M_n \times 10^{-4}$ | PDI |
|---|---|---|---|
| 45 | 0.74 | | |
| 105 | 0.81 | 7.93 | 2.28 |
| 270 | 0.83 | | |
| 480 | 0.89 | 10.55 | 1.95 |
| 1170 | 0.83 | 38.8 | 2.02 |

As seen above, the polymerization is faster than the previous one, although still slower than the reaction in which azide 1 was used. It is seen that there is a tendency of increase of molecular weights with conversion.

As a conclusion of these experiments, the polymerization initiated by different azides in water provides for a much better controlled polymerization of the charged monomer, NaVBA than for the neutral one, DMAEMA.

EXAMPLE 26

Polymerization of Sodium 4-Vinylbenzoate (NaVBA) in Water Initiated by Azide 2.

Target DP=100; 4-VBA—0.5031 g (3.5 mmol); 1.7 M solution of NaOH CuPF$_6$.4MeCN—0.0123 g (0.032 mmol); BiPy—0.0109 g (0.067 mmol); azide 2 (Me$_1$PEG based)— 23 $\mu$l; Temp. 40° C.

Reaction conditions are the same as in the previous reaction, but the azide 2 was used as initiator. It was shown that the reaction with this initiator is slower than this initiated by azide 1. This time, exactly the same conditions were used as example 27 in order to compare the kinetics.

TABLE 14

| Time of Polymerization, h | Conversion (NMR) | DP (NMR) | PDI |
|---|---|---|---|
| 1.5 | 0.032 | 72 | |
| 2.5 | 0.083 | 85 | |
| 6.25 | 0.31 | 115 | |
| 11 | 0.4334 | 120 | |

The polymerization is much slower than the example initiated by azide 3. CONTROLLED POLYMERIZATION OF MONOMERS BEARING A CATIONIC GROUP.

EXAMPLE 27

2-Trimethylammonioethyl Methacrylate Methanesulfonate (Ammonium 1).

3.14 g (20 mmol) DMAEMA was dissolved in 30 ml acetonitrile and 1.7 ml (2.203 g, 20 mmol) methyl methanesulfonate was added. The mixture was heated to 90° C. (reflux) with stirring for 24 h. At the end of the reaction period the mixture becomes viscous, indicating probably some polymerization of the methacrylate. The mixture was poured into 400 ml ether, and the precipitate was filtered and washed with ether, then dried in vacuo. The obtained salt is very hygroscopic. It contains a small amount of polymer, so this synthesis will be done again in the presence of inhibitor of polymerization, which can be removed after the reaction. Yield: 3.50 g (65%)

EXAMPLE 28

Synthesis of 2-Trimethylammonioethyl Methacrylate Triflate 2-TMAEMT (Nvt-Amm1)

The 2-trimethylammonioethylmethacrylate salts can be synthesized from 2-DMAEMA and a strong methylating agent. For the purpose of our experiments (ATRP), methyl iodide is not suitable as methylating agent, as it will introduce iodide anions. It was shown above that the reaction of pure (i.e. monomer not containing a polymerization inhibitor) 2-DMAEMA with methyl methanesulfate in acetonitrile was not satisfactory.

That is why identification of a different method was necessary. In a patent by Barney [Barney, A. L., U.S. Pat. No. 2,677,679, May 4, 1954 (Du Pont)], various alkylating agents have been suggested for the preparation of 2-methacroyloxyethyl trialkylammonium salts from 2-DMAEMA, including alkyl halides, sulfates, sulfonates, phosphates, and phosphites, although no experimental procedures are given. In another patent by Forshey and Kirby [Forshey, W. O., Jr., Kirby, J. E., U.S. Pat. No. 2,680,112, Jun. 1, 1954 (Du Pont)], methyl tosylate in ether, or dimethyl sulfate in butanone have been used to methylate 2-DMAEMA. It is known that methyl triflate is one of the best methylating agents (approximately $10^4$ to $10^5$ more reactive than methyl tosylate and methyl iodide [Hansen, R. L., *J. Org. Chem.*, 30, 4322 (1965)]), and has found a wide application as such [Howells, R. D., McCown, J. D., *Chem. Rev.*, 77, 69 (1977)]. Usually, methyl triflate is used in non-nucleophilic non-polar solvents, such as benzene and toluene.

The reaction was successfully carried out finally in benzene, giving practically quantitative yield of the title ammonium salt with triflate anion.

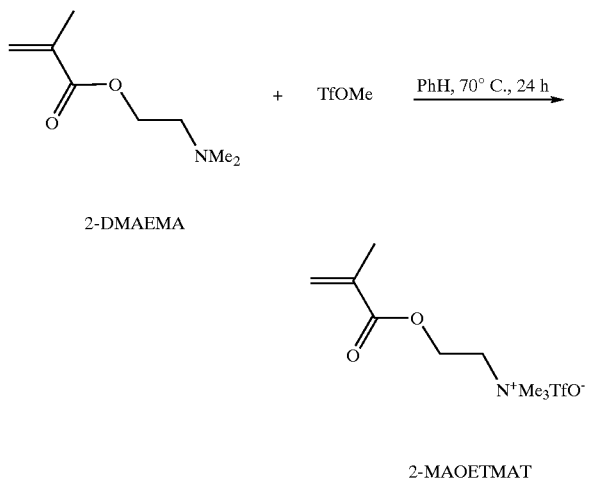

2-DMAEMA

2-MAOETMAT

In a 100 ml round-bottom flask, 2.997 g (19.06 mmol) 2-DMAEMA was dissolved in 30 ml benzene. The mixture was immersed in an ice-water bath, and 2.2 ml (3.19 g, 19.44 mmol) TfOMe were added (exothermic reaction). Then, a stirring bar was put in the flask, a reflux condenser attached, and the mixture was stirred for 24 h at 70° C. After 24 h, the mixture consisting of two liquid phases was cooled with ice, and the crystalline product was isolated by filtration. It was washed on the filter with total 100 ml benzene and dried in vacuum, to give a quantitative yield of 2-trimethylammonioethyl methacrylate triflate. The NMR spectrum of the salt in chloroform consists of the following signals: 6.14 ppm (d, 1H), 5.67 ppm (d, 1H), 4.56 ppm (t, 2H), 3.82 ppm (t, 2H), 3.30 ppm (s, 9H), and 1.93 ppm (s, 3H). The proton signals of the salt are slightly shifted upfield when water is used as the solvent: 6.05 ppm (d, 1H), 5.67 ppm (d, 1H), 4.55 ppm (t, 2H; overlaps with the signal of water), 3.70 ppm (t, 2H), 3.13 ppm (s, 9H), and 1.85 ppm (s, 3H). For comparison, the signals of the two methylene groups in 2-DMAEMA appear at 4.25 ppm and 2.62 ppm, and the signal of the two methyl groups attached to the nitrogen is at 2.32 ppm (spectrum in chloroform).

EXAMPLE 29

Synthesis of 2-Methacroyloxyethyl Trimethyl Ammonium Triflate 2-MAOETMAT (Nvt-Amm1-2)

This is a synthesis similar to this described above, but the reaction was performed at room temperature (instead of 60 or 70° C.) and for only 2 hours (instead of 10 or 24 h). The yield of the salt in this case was still very good and the salt was obtained as a very white crystalline solid (instead of the grayish salt).

In a 100 ml round-bottom flask, 3.5 ml (3.27 g; 0.0208 mol) 2-DMAEMA were dissolved in 30 ml benzene. The flask was then closed with a rubber septum and immersed in an ice-water bath. The reaction mixture was isolated from direct light wrapping the flask with aluminum foil. On stirring, 2.5 ml (3.63 g, 0.022 mol) TfOMe were added in portions for 5 minutes. The ammonium salt precipitated as a white solid. Then the mixture was stirred for additional 2 hours at room temperature. The salt was filtered, washed with 50 ml benzene on the filter, and dried in vacuum. Yield 5.90 g (0.0184 mol; 88.5%).

EXAMPLE 30

The Polymerization of 2-MAOETMAT in Water at 20° C. Using the Chlorine-Containing Initiator Nvt-Peg 4 (Nvt-Ammpol 8)

[Direct Preparation of a Water Soluble Block Copolymer with an Ionic Block]

The polymerization of this monomer has been shown to be extremely fast at 35 and 50° C. and in this experiment it was performed at lower temperature, namely 20° C. and in addition, the "slower" and hydrolytically stable chlorine-containing macroinitiator was used.

Target DP=100; 2-MAOETMAT—0.6426 g (2 mmol); CuCl—0.0020 g (0.02 mmol); bpy—0.0061 g (0.04 mmol); $Me_1PEG$-CP—13.5; reaction temperature 20° C.

CuBr and bpy were dissolved (after removing the oxygen from the flask) in 1 ml heavy water and a solution of 0.05 ml 4% solution of NaOD and the monomer in 2 ml deuterated water (deoxygenated) containing 0.15 ml of the NaOD solution were added, finally the initiator was added. Samples were taken periodically to check conversion and molecular weights by NMR. Under these polymerization conditions however, the polymerization was very slow, reaching 30% conversion after 18 h. During the polymerization, the mixture was bright red-orange and not entirely homogeneous (color similar to that of $Cu_2O$ indicating that probably the pH value was too high. That is why this will be done again at a lower pH value). After 18 h, the color of the reaction mixture was slightly green.

TABLE 15

| Time of Polymerization, h | Conversion (NMR) | DP (NMR) |
|---|---|---|
| 6 | 0.09 | 11 |
| 18 | 0.29 | 22 |

Note however that the experimental DP is very close to the calculated.

EXAMPLE 31

Synthesis of 2-Methacroyloxyethyl Trimethyl Ammonium Iodide 2-MAOETMAI (Nvt-Amm2)

In a 250 ml round-bottom flask, 10 ml (9.33 g, 0.059 mol) 2-DMAEMA were dissolved in 20 ml acetone. The flask was then closed with a rubber septum and immersed in an ice-water bath. On stirring, 4 ml (9.12 g, 0.064 mol) MeI were added in small portions for 10 minutes. The ammonium salt precipitated and it was difficult to stir the mixture. That is why, 10 ml acetone were added. Then the mixture was stirred for additional 2 hours at room temperature. The flask was covered with aluminum foil in order to avoid direct light (2-DMAEMA and probably—the corresponding ammonium salt—polymerize very easily when exposed to light). The white solid was filtered, washed with acetone on the filter, and dried in vacuum. Yield 16.644 g (0.0556 mol; 94.3%).

EXAMPLE 32

The polymerization of 2-MAOETMAI in Water at 20° C. Using the Chlorine-Containing Initiator Nvt-Peg 4 (Nvt-Ammpol 9)

This reaction is very similar to the above, but the iodide salt of the monomer was used in order to check whether there is an adverse influence from the use of a counter ion which can coordinate to copper. Target DP=100; 2-MAOETMAI—0.5983 g (2 mmol); CuCl—0.0020 g (0.02 mmol); bpy—0.0060 g (0.04 mmol); Me$_1$PEG-CP—13.5; reaction temperature 20° C.

CuBr and bpy were dissolved (after removing the oxygen from the flask) in 1 ml heavy water. Then, a 0.05 ml 4% solution of NaOD and a solution of the monomer in 3 ml deuterated water (deoxygenated) containing 0.15 ml of the NaOD solution were added. Unfortunately, the iodide is not very well soluble in water so a larger amount of solvent should be used. Even at this amount of water, heating of the mixture is necessary in order to dissolve the monomer, which then partially can precipitate at the lower reaction temperature (the reaction mixture was turbid). At the end, the initiator was added. Samples were taken periodically to check conversion and molecular weights by NMR. At these conditions, the polymerization was extremely slow, reaching less than 15% conversion after 18 h. During the polymerization, the mixture was grayish-brown and not entirely homogeneous. After 18 h, the color of the reaction mixture was bright orange, as it was in the previous reaction. Conversions could not be determined adequately, since they were very low event at long reaction times. This can be due to coordination of the iodide anion to copper, or also—to the lower monomer concentration.

EXAMPLE 33

Study of the Methylation of Poly(DMAEMA) with MeI

Figure 5:
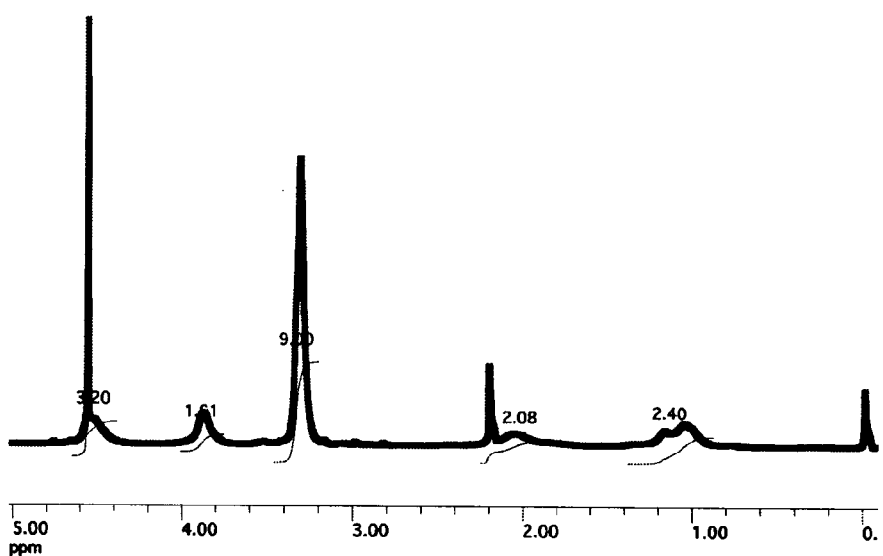
FIG. 5 is a graph of the $^1$H NMR spectrum of methylated poly(DMAEMA), iodide salt, in water indicating the methylation of the poly(DMAEMA) is complete.

DMAEMA was polymerized by conventional radical polymerization (15 ml DMAEMA, 10 ml water, 5 ml DMF, and 0.0799 g VA-044, at 70° C.), and a sample was methylated. 0.88 g poly(DMAEMA) were dissolved in 20 ml acetone. The mixture was not clear but after the addition of 4 ml of methanol, a clear solution was obtained. The flask was wrapped with aluminum foil in order to avoid the photochemical decomposition of the iodo compounds by direct light. To this, 1 ml iodomethane was added, the reaction mixture was stirred for 5 h at room temperature, and the precipitated polymeric ammonium salt was filtered and washed with acetone on the filter. The polymer was then dried. Yield: 1.275 g. A sample was dissolved in deuterated water, the sodium salt of deuterated 3-trimethylsilylpropionic acid-was added as internal standard, and NMR spectrum was taken. For comparison, the $^1$H NMR spectrum of poly(DMAEMA) in water consists of the following signals, in δ: 0.85–1.25 ppm (3H, CCH$_3$), 1.8–2.2 ppm (2H, CH$_2$ from backbone), 2.35 ppm (6H, N(CH$_3$)$_2$), 2.75 ppm (2H, NCH$_2$), and 4.18 ppm (OCH$_2$). As seen in FIG. 5, the methylation is complete—no remaining poly(DMAEMA) can be seen. The peak at 2.20 ppm is of some remaining acetone, and this at 4.63 belongs to water.
Ligands for the ATRP of Acidic Monomers

EXAMPLE 34

Stability of the Copper Complexes of DMDETS Towards Acids

In order to test the stability of the complex of CuCl$_2$ with DMDETS in methanol, towards highly acidic substances, such as TsOH, a spectroscopic study was performed. The following solutions were prepared:
(A) 0.0920 g DMDETS in 5 ml MeOH (0.101 M)
(B) 0.0070 g CuCl$_2$ in 5 ml MeOH (0.010 M)

Figure 4:
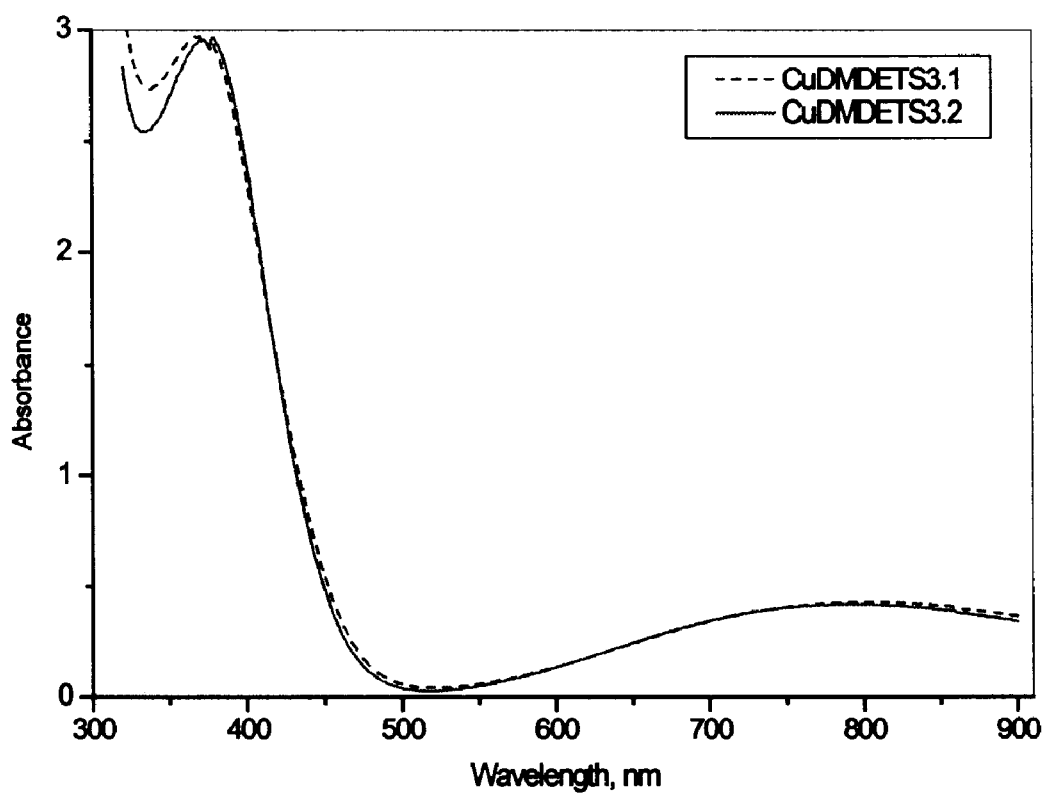
FIG. 4 is a graph comparison of the electronic spectra of absorbance of copper complexes of DMDETS versus wavelength in nanometers.

0.5 ml of (A) were mixed with 5 ml of (B) and the mixture was diluted to 10 ml. After one-day stay, 10 mg (0.053 mmol) of TsOH.H$_2$O were added to to 5 ml of the above solution (0.005 M to both CuCl$_2$ and DMDETS; the concentration of TsOH.H$_2$O was 0.01 M, i.e. the acid is in excess compared to the copper complex). The spectra of the solution in the presence of TsOH (CuDMDETS3.1) was the same as in the absence of the strong acid (CuDMDETS3.2), indicating that the complex is stable at these conditions. The comparison of the electronic spectra are presented in FIG. 4.

EXAMPLE 35

Attempt to Polymerize MMA in the Presence of CuCl/DMDETS

The following reagents were used:
MMA—4 ml
Butanone—2 ml
CuCl—0.0182 g (0.187 mmol)
DMDETS—30 μl (0.18 mmol)
EbiB—27 μl (target DP=200)
T=70° C.

After immersing the flask in the oil bath, the mixture becomes milky (turbid), and looks like some gas is generated from it. No polymerization occurred even after 20 hours. This can be due to the insolubility of the copper complex in the reaction medium or because of the redox potential of the complex.

As a conclusion, it seems that sulfur-based ligands are very promising for the ATRP of acidic monomers, since they are stable themselves, and also in the presence of acids. Obviously, the right ligand giving a complex with the suitable redox potential has to be found.

EXAMPLE 36

ATRP of the Cationic Monomers 2-TMAEMT in Water-Methanol (Nvt-Ammpol 10)

CuCl—0.0044 g
CuCl$_2$—0.0026 g (30% of the total Cu,. which is $3.11 \times 10^{-5}$ mol)
Bpy—0.0194 g
TMAEMT—2 g
methanol-d$_4$—1.5 ml, D$_2$O—1.5 ml
MePEGBiB of M.W. 699 g/mol—40 μl; DP(target)—100
T=25° C.

The monomer was dissolved in mixture of deuterated water and methanol. The solution was degassed very carefully (10 F-P-T cycles), since it is known, that reaction mixtures when this monomer is used, turn green very easily. The mixture was frozen, the flask opened, and the catalyst was added. After the flask was closed with rubber septum and sealed, while the solution was still frozen, vacuum was applied and the flask was back-filled with nitrogen several times. However, after warming the mixture to room temperature, the solution immediately turned green. Some brownish-red precipitate formed (copper), indicating that the copper (I) complex disproportionated.

EXAMPLE 37

ATRP of the Cationic Monomer 2-TMAEMT in Water-Pyridine (nvt-ammpol 12)
CuBr—0.0087 g
Bpy—0.0194 g
TMAEMT—2 g
pyridine—1.5 ml, H$_2$O—1.5 ml
MePEGBiB of M.W. 699 g/mol—40 μl;
DP(target)—100
T=25° C.

The same procedure was used as in example 36. After melting the solution, it remained brown even after the addition of the initiator. As expected pyridine has greater effect as a stabilizing agent for Cu(I) than acetonitrile. With time the mixture becomes slightly greenish, although the brown color of the Cu(I) still can be seen. After 30 min, the conversion reached 98% and the DP was 101 (NMR results after drying the samples and dissolving them in deuterated water). These preliminary results prove the correctness of the theoretical considerations given bellow.

We claim:

1. A controlled polymerization process for (co)polymerization of radically polymerizable ionic monomers, comprising:

initiating the polymerization of free radically (co)polymerizable ionic monomers in the presence of a system initially comprising:

a transition metal complex, and an initiator comprising a radically transferable atom or group; and an excess of one or more uncomplexed ligands.

2. The process of claim 1, wherein the excess ligand stabilizes the transition metal complex in the lower oxidation state.

3. The process of claim 1, wherein system comprises two or more ligands.

4. The process of claim 1, wherein at least one of the (co)polymerizable ionic monomers is anionic.

5. The process of claim 1, wherein the (co)polymerizable ionic monomers are cationic.

6. The process of claim 1, wherein the process is conducted in the presence of a solvent.

7. The process of claim 6, wherein the solvent is water.

* * * * *